United States Patent
Kim et al.

(10) Patent No.: US 12,540,558 B2
(45) Date of Patent: Feb. 3, 2026

(54) ACTIVE CLEARANCE CONTROL VALVES AND RELATED METHODS

(71) Applicant: General Electric Company, Schenectady, NY (US)

(72) Inventors: Taehong Kim, Evendale, OH (US); Timothy L. Schelfaut, Evendale, OH (US)

(73) Assignee: General Electric Company, Evandale, OH (US)

( * ) Notice: Subject to any disclaimer, the term of this patent is extended or adjusted under 35 U.S.C. 154(b) by 134 days.

(21) Appl. No.: 17/893,992

(22) Filed: Aug. 23, 2022

(65) Prior Publication Data
US 2024/0068375 A1     Feb. 29, 2024

(51) Int. Cl.
*F01D 11/20*     (2006.01)

(52) U.S. Cl.
CPC .......... *F01D 11/20* (2013.01); *F05D 2220/32* (2013.01)

(58) Field of Classification Search
CPC .......... F01D 11/14; F01D 11/20; F01D 11/24; F01D 25/12; F01D 17/10; F01D 17/105; F01D 17/12; F01D 17/14; F01D 17/145; F01D 17/148; F01D 17/167; F02B 37/183; F02B 37/186; F02C 6/08; F02C 7/18; F02C 9/18; F02C 9/20; F05D 2220/32
USPC ...................................... 415/173.1
See application file for complete search history.

(56) References Cited

U.S. PATENT DOCUMENTS

| | | | |
|---|---|---|---|
| 2,307,273 A * | 1/1943 | Hughes | F16K 3/03 251/118 |
| 2,701,440 A | 2/1955 | Reime et al. | |
| 4,094,492 A * | 6/1978 | Beeman | F16K 3/03 138/45 |
| 4,203,566 A * | 5/1980 | Lord | B64D 13/00 165/41 |
| 4,849,895 A * | 7/1989 | Kervistin | F01D 11/24 701/99 |
| 5,203,673 A | 4/1993 | Evans | |
| 7,717,667 B2 * | 5/2010 | Urbassik | F01D 11/24 415/1 |
| 7,922,445 B1 | 4/2011 | Pankey et al. | |
| 8,490,980 B2 * | 7/2013 | Wright | F01D 11/025 277/355 |
| 9,206,911 B1 * | 12/2015 | Daniels | F16K 3/03 |
| 9,518,513 B2 * | 12/2016 | Pritchard, Jr. | F02C 9/18 |
| 10,036,273 B2 * | 7/2018 | Kozuch | F01D 17/105 |
| 10,364,750 B2 * | 7/2019 | Rambo | F02K 3/115 |

(Continued)

FOREIGN PATENT DOCUMENTS

EP     3611351     2/2020

*Primary Examiner* — Nathaniel E Wiehe
*Assistant Examiner* — Justin A Pruitt
(74) *Attorney, Agent, or Firm* — Hanley, Flight & Zimmerman, LLC

(57) ABSTRACT

Active clearance control valves and related methods are disclosed. An example apparatus includes a pipe defining a flow path between (i) at least one of a fan section, a bypass airflow passage, or a compressor section and (ii) a turbine section of the gas turbine, the pipe including an inlet fluidly coupled to at least one of the fan section, the bypass airflow passage, or the compressor section, a valve coupled to the pipe and positioned downstream of the inlet, the valve including swing wings, the swing wings positioned around an opening in the pipe defined by the second valve when the second valve is at least partially open.

17 Claims, 17 Drawing Sheets

(56) References Cited

U.S. PATENT DOCUMENTS

| | | |
|---|---|---|
| 10,584,719 B2 | 3/2020 | Zeng et al. |
| 10,823,302 B2 | 11/2020 | Waddell et al. |
| 10,876,638 B2 | 12/2020 | Moens et al. |
| 11,015,721 B2 | 5/2021 | Sakizchi et al. |
| 11,073,108 B2 * | 7/2021 | Hussain .................... F02C 6/08 |
| 11,105,218 B2 | 8/2021 | Karstadt et al. |
| 11,260,978 B2 | 3/2022 | Caron |
| 2017/0328278 A1 * | 11/2017 | Hussain ................ F04D 27/023 |

* cited by examiner

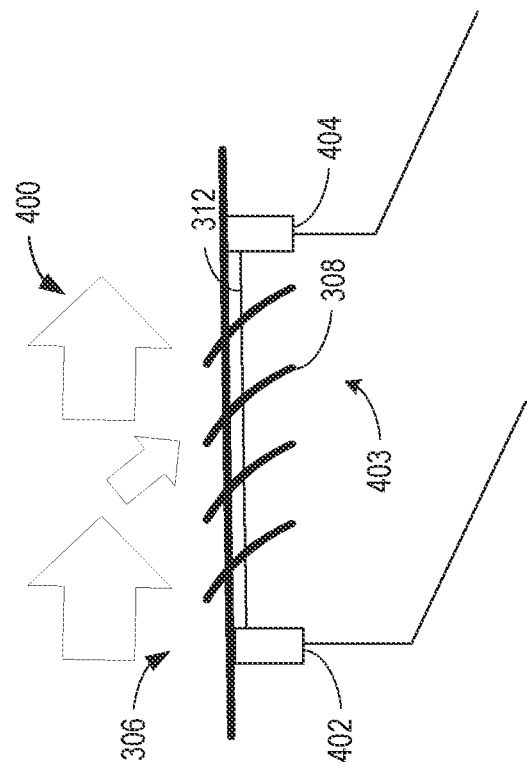
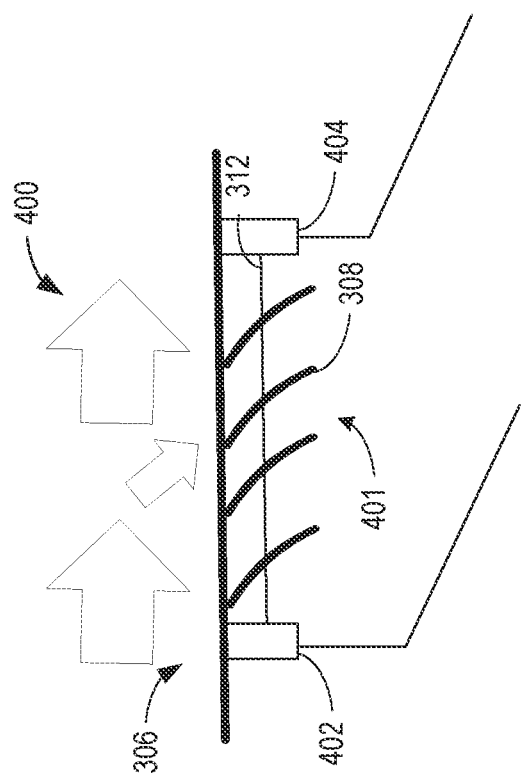

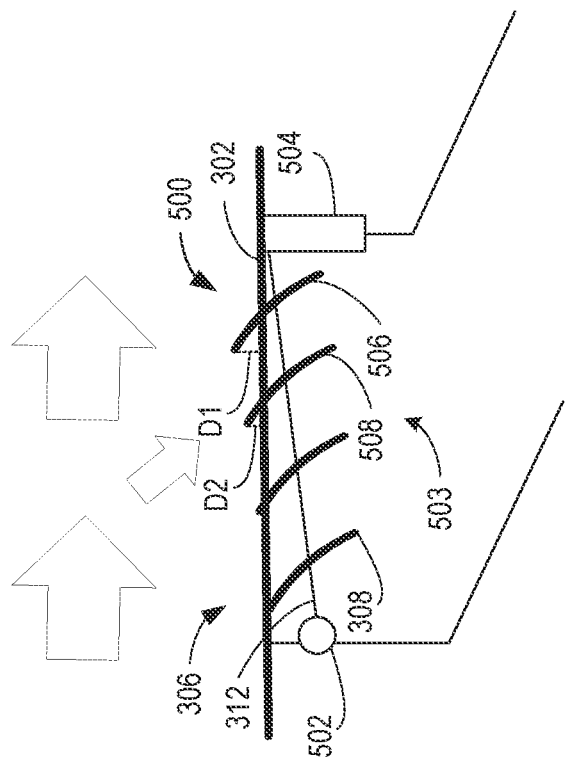
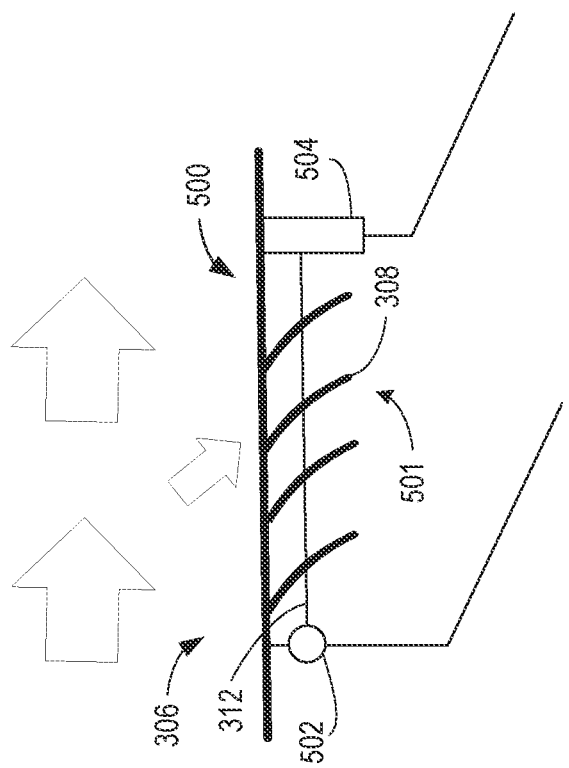

ACTIVE CLEARANCE CONTROL VALVES AND RELATED METHODS

FIELD OF THE DISCLOSURE

This disclosure relates generally to gas turbines and, more particularly, to active clearance control valves and related methods.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In general, it is desirable for a gas turbine engine to maintain a target clearance between the tip of a blade in the gas turbine engine and the stationary parts of the gas turbine engine (e.g., the gas turbine engine casing, stator, etc.). During operation, the gas turbine engine is exposed to thermal (e.g., hot and cold air pumped into the gas turbine engine, etc.) and mechanical loads (e.g., centrifugal force on the blades on the gas turbine engine, etc.), which can expand and contract the gas turbine engine casing and rotor. The expansion and contraction of the gas turbine engine casing can change the clearance between the blade tip and the stationary parts of the gas turbine engine. There is a continuing need to control the clearance between the blade tip and the engine casing that fluctuates during normal operation for a gas turbine engine to avoid damage to the gas turbine engine (e.g., wear, breakage, etc. due to unintentional rub) as well as maximize efficiency and specific fuel consumption of the gas turbine engine.

BRIEF DESCRIPTION OF THE DRAWINGS

FIG. 4A illustrates another example inlet valve associated with the ACC system(s) of FIGS. 2A, 2B, 2D, and/or 2E in a first example position.

FIG. 4B illustrates the example inlet valve of FIG. 4A in a second example position.

FIG. 5A illustrates another example inlet valve associated with the ACC system(s) of FIGS. 2A, 2B, 2D, and/or 2E in a first example position.

FIG. 5B illustrates the example inlet valve of FIG. 5A in a second example position.

In general, the same reference numbers will be used throughout the drawing(s) and accompanying written description to refer to the same or like parts. The figures are not to scale.

DETAILED DESCRIPTION

Figure 1:
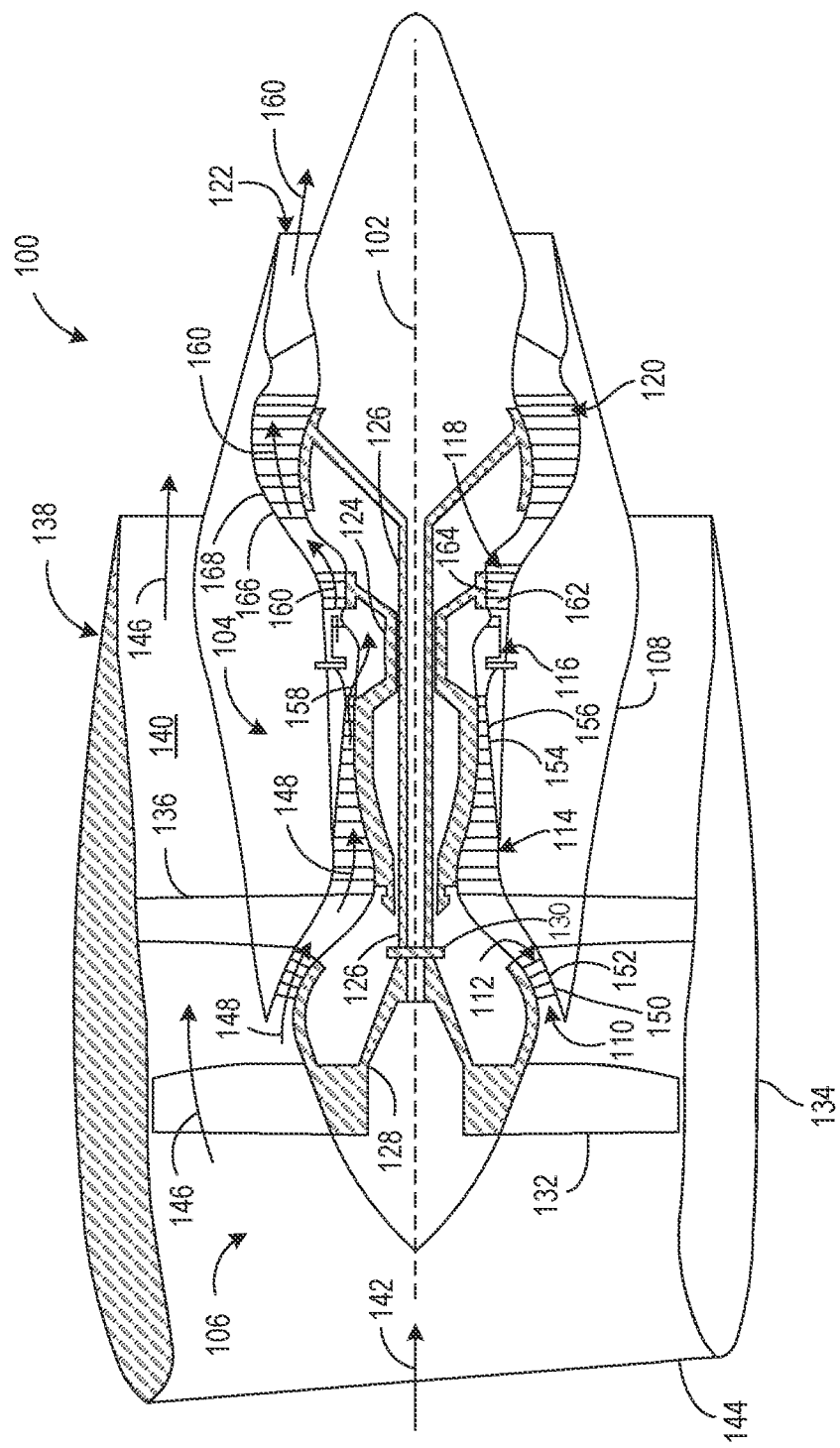
FIG. 1 is a schematic cross-sectional view of an example gas turbine engine in accordance with the examples disclosed herein.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "approximately" and "about" modify their subjects/values to recognize the potential presence of variations that occur in real world applications. For example. "approximately" and "about" may modify dimensions that may not be exact due to manufacturing tolerances and/or other real-world imperfections as will be understood by persons of ordinary skill in the art. For example. "approximately" and "about" may indicate such dimensions may be within a tolerance range of +/−10% unless otherwise specified in the below description.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 100. As used herein, "lateral" refers to the direction perpendicular to the axial and vertical directions (e.g., into and out of the plane of FIGS. 1, 2A-2F, etc.).

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B. and/or C refers to any combination or subset of A, B, C such as (1) A alone, (2) B alone, (3) C alone, (4) A with B, (5) A with C. (6) B with C, or (7) A with B and with C. As used herein in the context of describing structures, components, items, objects and/or things, the phrase "at least one of A and B" is intended to refer to implementations including any of (1) at least one A. (2) at least one B. or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B. or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second." "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors. Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

A turbine engine, also called a combustion turbine or a gas turbine, is a type of internal combustion engine. Turbine engines are commonly utilized in aircraft and power-generation applications. Furthermore, turbine engines can be utilized in various configurations, such as a turbojet, a turboprop, a turboshaft, (e.g., an electric generator), a high-bypass turbofan, a low-bypass afterburning turbofan, etc. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. A turbine engine also includes a turbine with an intricate array of alternating rotatable and stationary airfoil-section blades. As the hot combustion gas passes through the turbine, the hot combustion gas expands, causing a rotary motion of the rotatable blades.

The components of the turbine engine (e.g., the fan, the booster compressor, the high-pressure compressor, the high-pressure turbine, the low-pressure turbine, etc.) can degrade over time due to demanding operating conditions, such as extreme temperature and vibration. During operation, the turbine engine components are exposed to thermal conditions (e.g., hot and/or cold air pumped into the turbine engine, etc.) and mechanical loads (e.g., centrifugal force on the blades in the turbine engine, etc.), which can expand and contract the turbine engine casing and/or compressor casing within the turbine engine along with other components of the turbine engine. The expansion and contraction of the turbine engine casing and/or compressor casing within the turbine engine can affect a clearance between the rotatable blades and the stationary components of the turbine engine. In some examples, when the clearance between the rotatable blades and the stationary components is eliminated or is smaller than a threshold clearance, then the rotatable blades can contact the stationary components during operation and lead to further degradation of the components of the turbine engine. Alternatively, when the clearance between the blade tips and the stationary components increases and/or is greater than a threshold clearance, a resulting gap between the rotatable blades and the stationary components causes the turbine engine to operate with a reduced efficiency (e.g., a higher specific fuel consumption).

Active Clearance Control (ACC) Systems have been developed to optimize blade tip clearance for engine performance improvement without unexpected rub events between the rotatable blades and the stationary components during flight and ground operations. ACC Systems utilize air driven by a fan and/or compressor to control a thermal expansion of a stationary engine component (e.g., the stator, the case, etc.) and, in turn, the clearance between the rotatable blade and the stationary engine component. For example, when the stationary engine component encounters temperatures that cause the stationary component to expand, the ACC systems can provide cooling air to the stationary component to reduce the thermal expansion and maintain a desired clearance between the rotatable blades and the stationary components.

The conventional ACC system includes a butterfly valve in a pipe that carries the air driven by the fan and/or the compressor to the stationary engine component. Accordingly, the butterfly valve controls a rate at which the air flows through the pipe and, in turn, the thermal expansion that the stationary component encounters. Although butterfly valves are relatively inexpensive, positional adjustments of a butterfly valve cause non-linear changes to a flow rate within the pipe. That is, a linear change in an open area of the pipe defined by an angular position of the butterfly valve causes the flow rate within the pipe to change non-linearly. As such, the butterfly valves necessitate meticulous pre-implementation testing and validation to develop a model that relates precise positions of the butterfly valve and respective flow rates that the positions cause.

Examples disclosed herein optimize or otherwise improve an ACC system using valves that linearly control a rate at which air flows through an ACC pipe to a stationary engine component for thermal expansion control and/or enable an increased flow rate of air to enter the ACC pipe. As such, examples disclosed herein enable straightforward pre-implementation testing and system development to reduce workloads and/or costs associated with the implementation of the ACC system as well as improve performance of the ACC system. In certain examples, an actuator can cause at least a portion of an ACC valve to protrude into an airflow passage such that the ACC valve can divert air in the airflow passage into the ACC pipe to increase a flow rate in the ACC pipe. Thus, examples disclosed herein can control the thermal expansion of the stationary engine component with less reliance on the engine operating conditions and the rate at which the air is flowing through the airflow passage. As a result, examples disclosed herein enable the thermal expansion of the stationary engine component to be controlled with increased precision and magnitude. Thus, examples disclosed herein can minimize or otherwise improve a specific fuel consumption exhibited by a gas turbine during operations.

The example ACC system disclosed herein can include a first valve and/or a second valve to control the rate at which air flows through the ACC pipe that provides the air to the stationary engine component for thermal expansion control. For example, the ACC pipe can include one or more inlets to receive air from a fan section, a bypass airflow passage, and/or a compressor section of the gas turbine. Specifically, the bypass airflow passage can be positioned between a nacelle and a core or casing of the gas turbine. Further, the ACC pipe can include outlets to release the air in and/or around a turbine section of the gas turbine and/or another portion of the compressor.

In certain examples, the first valve is positioned at the inlet(s) of the ACC pipe. Accordingly, the first valve can be positioned between the ACC pipe and an airflow passage defined by the fan section, the bypass airflow passage, and/or the compressor section. The example first valve includes vanes, and an angular displacement of the vanes defines a cross-sectional area through which the air passes from the airflow passage into the ACC pipe. The example ACC system disclosed herein includes an actuator operatively coupled to the vanes to control the angular displacement of the vanes and, in turn, a rate at which the air enters the ACC pipe.

In certain examples, the ACC system includes an actuator operatively coupled to the vanes to cause a translational movement of at least one of the vanes. For example, the first valve can include a first end (e.g., an upstream end relative to a flow direction in the airflow passage) and a second end (e.g., a downstream end relative to the flow direction in the airflow passage), and the actuator can cause the first end and/or the second end to move towards the airflow passage, which causes the vanes to extend into the airflow passage. As a result, the vanes can intercept more air from the airflow passage to increase a rate at which the air flows through the ACC pipe. In some examples, the actuator causes the second end to move closer than the first end to the airflow passage such that the respective vanes intercept the air from different cross-sectional areas of the airflow passage. In some examples, the actuator only causes the second end of the first valve to translate towards the airflow passage. For example, the first end can include a pivot joint about which the vanes revolve when the actuator causes the second end to move towards the airflow passage. In turn, a first vane may protrude into the airflow passage more than a second vane that is upstream of the first vane.

Furthermore, the examples vanes disclosed herein include curvature in a plane defined by a direction in which the air flows through the airflow passage to minimize or otherwise reduce drag and/or turbulence caused by the vanes during operations. Specifically, a respective vane includes an upstream face and a downstream face opposite the upstream face. The upstream face can include a concave curvature and the downstream face can include a convex curvature to smoothly guide the air from the airflow passage into the ACC pipe when the first valve is at least partially open.

In certain examples, the second valve is positioned in the ACC pipe downstream of the inlet. The example second valve linearly controls a rate at which air flows through the ACC pipe. Specifically, the second valve can be positioned between a first portion of the ACC pipe and a second portion of the ACC pipe downstream of the first portion. When the second valve is at least partially open, the second valve enables an open flow area in the ACC pipe to be defined by a single continuous (e.g., fully connected, undivided by the second valve, etc.) opening. Furthermore, positional adjustments of the second valve add to or subtract from the single continuous opening to linearly adjust the rate at which the air flows through the ACC pipe. As a result, flow rates associated with respective positions of the second valve can be modeled linearly, which enables the valve to be implemented with reduced testing compared to a valve that has positional adjustments that adjust the flow rate nonlinearly, such as the butterfly valve. When opening, the second valve moves away from a center of the ACC pipe towards a perimeter of the ACC pipe. Accordingly, when closing, the second valve extends closer to the center of the ACC pipe. Thus, the second valve can block an outer portion of the flow path defined by the ACC pipe while leaving a middle portion of the flow path open. As a result, the second valve can minimize or otherwise reduce turbulence in the ACC pipe.

In some examples, the second valve includes swing wings that define the opening. In some examples, the second valve includes pivot rods coupled to respective ends of the swing wings about which the swing wings rotate to increase or decrease a size of the opening. In some examples, the pivot rods are positioned between an inner hoop and an outer hoop. Specifically, respective positions of the pivot rods may be fixed relative to the inner hoop but not the outer hoop. For example, the inner hoop can include roller bearings in contact with an inner radial portion of the pivot rods to enable the pivot rods to rotate while remaining in a fixed position along a perimeter of the inner hoop. Accordingly, the outer hoop can contact an outer radial portion of the pivot rods. To rotate the pivot rods, the example ACC system can include an actuator to drive a rotation of the outer hoop. The rotation of the outer hoop can cause the pivot rods to rotate against the roller bearings of the inner hoop and, in turn, cause the swing wings to pivot about the respective pivot rods to increase or decrease a size of an opening defined by the second valve. Accordingly, the swing wings can be positioned around the single continuous opening in the ACC pipe when the second valve is at least partially open.

In certain examples, the respective swing wings include a first edge (e.g., a leading edge) and a second edge (e.g., a trailing edge). In some examples, the first edge includes a convex curvature, and the second edge includes a concave curvature. In some examples, the curvature in the leading and trailing edges of the swing wings enables the single continuous opening to be circular and have a center point that corresponds with a center of the ACC pipe.

In examples disclosed herein, adjacent swing wings overlap. For example, the second valve can include a first swing wing overlapping a second swing wing. In some examples, the first swing wing overlaps the second swing wing regardless of a position of the second valve (e.g., when the second valve is at least partially open, when the second valve is closed). In some examples, the ACC system includes the first valve or the second valve (i.e., not both) to control blade clearance in a gas turbine.

Certain examples provide a portion of an engine controller, referred to as a full authority digital engine (or electronics) control (FADEC). The FADEC includes a digital computer, referred to as an electronic engine controller (EEC) or engine control unit (ECU), and related accessories that control aspects of aircraft engine performance. The FADEC can be used with a variety of engines such as piston engines, jet engines, other aircraft engines, etc. In certain examples, the EEC/ECU is provided separate from the FADEC, allowing manual override or intervention by a pilot and/or another operator.

In examples disclosed herein, the engine controller receives values for a plurality of input variables relating to flight condition (e.g., air density, throttle lever position, engine temperatures, engine pressures, etc.). The engine controller computes engine operating parameters such as fuel flow, stator vane position, air bleed valve position, etc., using the flight condition data. The engine operating parameters can be used by the engine controller to control the actuator(s) associated with the first valve and/or the second valve and, in turn, a flow rate in the ACC pipe to modulate blade tip clearance in the turbine engine and optimize or otherwise improve a specific fuel consumption of the turbine engine. For example, when the engine controller determines a case is expanding, the engine controller can at least partially open the first valve and/or the second valve to cause cooling air to flow to the case and, thus, cause the case to shrink and maintain the desired blade tip clearance. In some examples, the engine controller causes the first valve and/or the second valve to open in response to a size of the case satisfying (e.g., being greater than) a first size threshold. Additionally or alternatively, when the engine controller determines the case is expanding, the engine controller can cause the vanes of the first valve to protrude into the airflow passage to enable more air to enter the ACC pipe and cool the case. In some examples, the engine controller causes the vanes of the first valve to protrude into the airflow passage in response to the size of the case satisfying (e.g., being greater than) a second size threshold. In some examples, the engine controller determines when to cause the vanes to protrude into the airflow passage based on engine operating conditions (e.g., a power output of the engine, a temperature of the engine, etc.). Conversely, when the engine controller determines the case is contracting or is smaller than a third size threshold, the engine controller can cause the first valve and/or the second valve to at least partially close to reduce a rate at which the cooling air flows to the case and, thus, help stop the contraction of the case to maintain the desired blade tip clearance.

FIG. 1 is a schematic cross-sectional view of a conventional turbofan-type gas turbine engine 100 ("turbofan 100"). As shown in FIG. 1, the gas turbine engine 100 defines a longitudinal or axial centerline axis 102 extending therethrough for reference. In general, the gas turbine engine 100 may include a core turbine 104 disposed downstream from a fan section 106.

The core turbine 104 generally includes a substantially tubular outer casing 108 that defines an annular inlet 110. The outer casing 108 can be formed from a single casing or multiple casings. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 may also couple to a fan spool or shaft 128 of the fan section 106. In some examples, the LP shaft 126 may couple directly to the fan shaft 128 (i.e., a direct-drive configuration). In alternative configurations, the LP shaft 126 may couple to the fan shaft 128 via a reduction gearbox 130 (i.e., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the gas turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the gas turbine engine 100, the core turbine 104 serves a similar purpose and operates in a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2A:
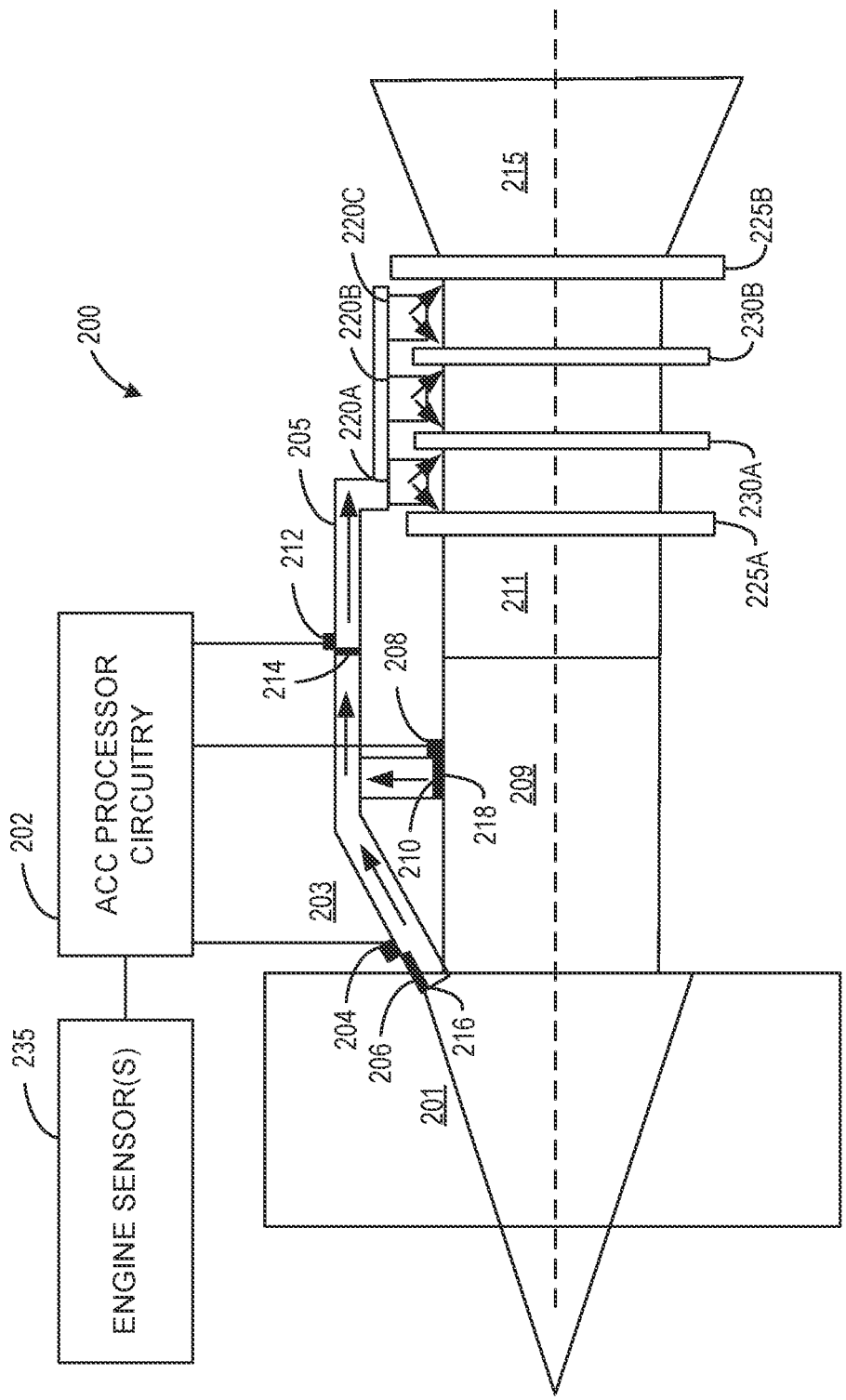
FIG. 2A is a schematic cross-sectional view of a first example active clearance control (ACC) system that can be utilized in the gas turbine engine of FIG. 1.

FIG. 2A is a schematic cross-sectional view of a first example active clearance control (ACC) system 200 that can be utilized in the example gas turbine engine 100 of FIG. 1. The first example ACC system 200 includes a first pipe 205 (e.g., a conduit, a duct, a tube, etc.), a high-pressure turbine 211 (e.g., the HP turbine 118 of FIG. 1), a low-pressure turbine 215 (e.g., the LP turbine 120 of FIG. 1), manifolds 220A, 220B, 220C, flanges 225A, 225B, and mid-rings 230A, 230B. In addition, the first ACC system 200 includes a first inlet valve 206, a second inlet valve 210, and a mid-pipe valve 214 operatively coupled to the first pipe 205. The first example ACC system 200 also includes a first actuator(s) 204 operatively coupled to the first inlet valve 206, a second actuator(s) 208 operatively coupled to the second inlet valve 210, and a third actuator(s) 212 operatively coupled to the mid-pipe valve 214. Furthermore, the first example ACC system 200 includes ACC processor circuitry 202 operatively coupled to the respective actuators 204, 208, 212 and an engine sensor(s) 235 communicatively coupled to the ACC processor circuitry 202.

Example ACC systems may include a different quantity of the first inlet valve 206, the second inlet valve 210, and/or the mid-pipe valve 214 along with their respective actuator(s) 204, 208, 212, as discussed in further detail below in association with FIGS. 2B-2F. In some examples, the quantity of the first inlet valve 206, the second inlet valve 210, and/or the mid-pipe valve 214 that an example ACC system includes may depend on a configuration of a pipe of the ACC system (e.g., the first pipe 205) or a precision with which the example ACC system is to control air being utilized to control blade clearance.

In the illustrated example of FIG. 2A, the airflow in the first pipe 205 is shown by the arrows in FIG. 2A. As shown, the first pipe 205 delivers the air from a fan section 201 (e.g., the fan section 106 of FIG. 1), a bypass airflow passage 203 (e.g., the bypass airflow passage 140 of FIG. 1), and/or a compressor section 209 (e.g., the LP compressor 112, the HP compressor 114, etc.) to the manifolds 220A. 220B, 220C. In turn, the manifolds 220A, 220B, 220C evenly distribute the air from the fan section 201, the bypass airflow passage 203, and/or the compressor section 209 to the high-pressure turbine 211 and/or the low-pressure turbine 215. The flanges 225A, 225B and mid-rings 230A, 230B are joined to outer surfaces of a case of the high-pressure turbine 211 and/or a case of the low-pressure turbine 215. The flanges 225A, 225B and mid-rings 230A, 230B are configured to contract radially inward and/or expand radially outward in response to encountering changes in temperature (e.g., changes in temperature caused by the air from the manifolds 220A, 220B, 220C, changes in temperature caused by combustion gases flowing through the high-pressure turbine 211 and/or the low-pressure turbine 215, etc.). As such, the manifolds 220A, 220B, 220C direct at least some of the air that flows through the first pipe 205 to impinge on the surfaces of the flanges 225A, 225B and mid-rings 230A, 230B to affect the contraction inward and/or the expansion outward of the flanges 225A, 225B and the mid-rings 230A, 230B. As a result, the contraction inward and/or the expansion outward of the flanges 225A, 225B and the mid-rings 230A, 230B can change blade tip clearances in the high-pressure turbine 211 and/or the low-pressure turbine 215.

In the illustrated example of FIG. 2A, the first inlet valve 206 is positioned at a first inlet 216 of the first pipe 205. The first inlet 216 receives air from (e.g., is in fluid connection with) a fan section 201 and/or a bypass airflow passage 203. Accordingly, the air that enters the first pipe 205 through the first inlet 216 can correspond to the first portion 146 of the air 142 of FIG. 1. In the illustrated example, a position (e.g., a configuration, an orientation, etc.) of the first inlet valve 206 affects a rate at which the air enters the first pipe 205 through the first inlet 216, as discussed in further detail below. As such, the first inlet valve 206 can affect a rate at which the air impinges on the surfaces of the flanges 225A, 225B and mid-rings 230A. 230B to help control the blade tip clearances in the high-pressure turbine 211 and/or the low-pressure turbine 215.

In particular, the first inlet valve 206 includes vanes positioned across the first inlet 216. When the first inlet valve 206 is at least partially open, the vanes define a cross-sectional area through which the air from the fan section 201 and/or the bypass airflow passage 203 can enter the first pipe 205 through the first inlet 216. Specifically, the vanes can be oriented in a first direction (e.g., a direction substantially perpendicular to a flow of the air) across the first inlet 216. Further, when the first inlet valve 206 is at least partially open, adjacent vanes are separated from each other in a second direction (e.g., in a direction defined by the flow of the air) to define slots that form the cross-sectional area through which the air from the fan section 201 and/or the bypass airflow passage 203 can enter the first pipe 205 through the first inlet 216.

The vanes of the first inlet valve 206 are rotatable to enable adjustments to the cross-sectional area of the first inlet 216 through which the air can enter the first pipe 205. Additionally or alternatively, the vanes of the first inlet valve 206 can move into the airflow passage defined by the fan section 201 and/or the bypass airflow passage 203. For example, the vanes can translate towards the airflow passage defined by the fan section 201 and/or the bypass airflow passage 203 to cause at least a portion of at least one of the vanes to extend into the airflow passage defined by the fan section 201 and/or the bypass airflow passage 203. Accordingly, a portion of the air flowing through the airflow passage(s) that would otherwise flow past the first inlet 216 can contact the vane(s), which guides (e.g., deflects) the air through the first inlet 216 and into the first pipe 205. The first inlet valve 206 is discussed further in association with FIGS. 3A-3C, 4A-4B, and/or 5A-5B.

In the illustrated example of FIG. 2A, the second inlet valve 210 is positioned at a second inlet 218 of the first pipe 205. The second inlet 218 receives air from (e.g., is in fluid connection with) the compressor section 209. Accordingly, the air that enters the first pipe 205 through the second inlet 218 can correspond to the second portion 148 of the air 142 of FIG. 1. In the illustrated example, a position (e.g., a configuration, an orientation, etc.) of the second inlet valve 210 affects a rate at which the air enters the first pipe 205 through the second inlet 218, as discussed in further detail below. As such, the second inlet valve 210 can affect a rate at which the air impinges on the surfaces of the flanges 225A, 225B and mid-rings 230A, 230B to help control the blade tip clearances in the high-pressure turbine 211 and the low-pressure turbine 215. In some examples, the second inlet valve 210 is substantially similar to (e.g., includes the same structure and/or functions as) the first inlet valve 206. Accordingly, the second inlet valve 210 is also discussed further in association with FIGS. 3A-3C, 4A-4B, 5A-5B, 6A-6C, and 8A.

In the illustrated example of FIG. 2A, the mid-pipe valve 214 is positioned between the inlets 216, 218 and the manifolds 220A, 220B, 220C (e.g., downstream of the inlets 216, 218 and upstream of the manifolds 220A, 220B, 220C). In the illustrated example of FIG. 2A, a position (e.g., a configuration, an orientation, etc.) of the mid-pipe valve 214 can control a rate at which the air that enters the first pipe 205 encounters the manifolds 220A, 220B, 220C. As such, the mid-pipe valve 214 can affect a rate at which the air impinges on the surfaces of the flanges 225A, 225B and mid-rings 230A, 230B to help control the blade tip clearances in the high-pressure turbine 211 and the low-pressure turbine 215.

In the illustrated example of FIG. 2A, when the mid-pipe valve 214 is at least partially open, the mid-pipe valve 214 is positioned around an opening in the first pipe 205 through which the air flows. In some examples, the opening is a circular opening approximately at a center of a cross-sectional area of the first pipe 205. The position or configuration of the mid-pipe valve 214 can affect the size of the opening and, in turn, the rate at which the air flows towards the manifolds 220A, 220B, 220C.

For example, the mid-pipe valve 214 can include rotatable swing wings positioned around the opening in the first pipe 205. In some examples, the mid-pipe valve 214 includes pivot rods to which the swing wings are coupled. Further, the pivot rods can be positioned between and supported by an inner bearing and an outer bearing. In some examples, a rotation of the outer bearing can cause the pivot rods to rotate and, in turn, move the swing wings to increase or decrease a size of the opening. In some examples, the swing wings include curvature defined along respective edges of the swing wings. In some examples, the curvature and an overlap of the swing wings causes the opening to be defined by a circular cross-sectional area through which the air flows towards the manifolds 220A, 220B, 220C. Moreover, the circular opening defined by the mid-pipe valve 214 enables the air to flow through an entirety of the opening. In other words, the circular opening defined by the mid-pipe valve 214 prevents or otherwise reduces turbulence in the first pipe 205 that would otherwise result from usage of other valves, such as a butterfly valve. In the illustrated example of FIG. 2A, a positional adjustment of the mid-pipe valve 214 linearly increases or decreases a size of the circular opening to cause the rate at which the air is provided to the manifolds 220A, 220B, 220C to linearly increase or decrease. Accordingly, the mid-pipe valve 214 enables simple flow rate calculations and, thus, enables implementation of the mid-pipe valve 214 with a reduced burden resulting from testing and/or flow rate-to-valve position model development. The mid-pipe valve 214 is discussed further in association with FIGS. 7A, 7B, 8A, 8B, and 8A.

In the illustrated example of FIG. 2A, the first actuator(s) 204 and the second actuator(s) 208 can cause the rotation of the vanes of the first inlet valve 206 and the second inlet valve 210, respectively. The first actuator(s) 204 and the second actuator(s) 208 can include any number of actuators to control the angular orientation of the vanes of the first inlet valve 206 and the second inlet valve 210, respectively. In some examples, the first actuator(s) 204 and the second actuator(s) 208 include an actuator that causes the rotation of all of the vanes of the first inlet valve 206 and the second inlet valve 210, respectively. For example, the first actuator(s) 204 and the second actuator(s) 208 can be coupled to a frame or a bracket of the first inlet valve 206 to which the vanes are rotatably coupled. In some examples, the first actuator(s) 204 and the second actuator(s) 208 include respective actuators to cause the rotation of the respective vanes. For example, the respective actuators of the first actuator(s) 204 and the second actuator(s) 208 can each be operatively coupled to, and drive a rotation of, one of the vanes.

Additionally or alternatively, the first actuator(s) 204 and the second actuator(s) 208 can move the vanes of the first inlet valve 206 and the second inlet valve 210, respectively, towards or away from the adjacent airflow passage. For example, the first actuator(s) 204 and the second actuator(s) 208 can cause the vanes of the first inlet valve 206 and the second inlet valve 210, respectively, to translate towards or away from the airflow passage defined by the fan section 201, the bypass airflow passage 203, and/or an airflow passage defined by the compressor section 209. In some examples, the first actuator(s) 204 and the second actuator(s) 208 cause both upstream and downstream ends of the first inlet valve 206 and the second inlet valve 210, respectively, to translate. As a result, the first actuator(s) 204 and the second actuator(s) 208 can cause all of the vanes of the first inlet valve 206 and the second inlet valve 210, respectively, to protrude into the adjacent airflow passage. In some examples, the first actuator(s) 204 and the second actuator(s) 208 cause downstream ends of the first inlet valve 206 and the second inlet valve 210, respectively, to move towards the adjacent airflow passage. As such, the first actuator(s) 204 and the second actuator(s) 208 can cause downstream ones of the vanes to protrude into the adjacent airflow passage more than upstream ones of the vanes.

In the illustrated example of FIG. 2A, the third actuator(s) 212 control a size of the opening defined by the mid-pipe valve 214. For example, the third actuator(s) 212 can cause a rotation of the outer bearing to rotate the pivot rods and, in turn, move the swing wings to open or close the opening. In some examples, the third actuator(s) 212 rotate the pivot rods of the mid-pipe valve 214 directly.

The first actuator(s) 204, the second actuator(s) 208, and the third actuator(s) 212 can be implemented by one or more types of actuators. For example, the first actuator(s) 204, the second actuator(s) 208, and/or the third actuator(s) 212 can be implemented by at least one of a linear actuator, a rotary actuator, a hydraulic actuator, a pneumatic actuator, an electric actuator, etc. In some examples, the first actuator(s) 204, the second actuator(s) 208, and/or the third actuator(s) 212 are implemented by at least one actuator that controls multiple movable parts of the respective valves 206, 210, 214. In some examples, the first actuator(s) 204, the second actuator(s) 208, and/or the third actuator(s) 212 are implemented by a plurality of actuators that individually control movements of respective parts of the respective valves 206, 210, 214.

To control the air that the ACC system 200 utilizes to help control the blade clearance in the high-pressure turbine 211 and the low-pressure turbine 215, the ACC processor circuitry 202 controls respective positions of the first inlet valve 206, the second inlet valve 210, and/or the mid-pipe valve 214 based on signals from the engine sensor(s) 235. In the illustrated example, the ACC processor circuitry 202 determines a blade tip clearance or a blade tip clearance change in the high-pressure turbine 211 and/or the low-pressure turbine 215 based on the signals from the engine sensor(s) 235. For example, the ACC processor circuitry 202 can determine whether there is a contraction inward and/or an expansion outward of the flanges 225A, 225B and the mid-rings 230A, 230B based on the signals from the engine sensor(s) 235. To control the contraction or expansion, the ACC processor circuitry 202 can determine a rate at which the air from the fan section 201, the bypass airflow passage 203, and/or the compressor section 209 is to be provided to the flanges 225A, 225B and the mid-rings 230A, 230B.

In the illustrated example of FIG. 2A, the ACC processor circuitry 202 controls respective positions of the first inlet valve 206, the second inlet valve 210, and/or the mid-pipe valve 214 based on the determined flow rate and/or temperature of the air to be utilized for blade clearance control. In particular, the ACC processor circuitry 202 modulates the position(s) of the first inlet valve 206, the second inlet valve 210, and/or the mid-pipe valve 214 through signals to the first actuator(s) 204, the second actuator(s) 208, and/or the third actuator(s) 212, respectively, to optimize or otherwise improve the blade tip clearances in the high-pressure turbine 211 and the low-pressure turbine 215.

For example, the ACC processor circuitry 202 can generate and transmit a signal to the first actuator(s) 204 to cause the first actuator(s) 204 to adjust a position of the first inlet valve 206 and, in turn, adjust a rate at which the air enters the first inlet 216. Similarly, the ACC processor circuitry 202 can generate and transmit a signal to the second actuator(s) 208 to cause the second actuator(s) 208 to adjust a position of the second inlet valve 210 and, in turn, adjust a rate at which the air enters the second inlet 218. In some examples, the ACC processor circuitry 202 determines an angular orientation in which the vanes of the first inlet valve 206 and/or the vanes of the second inlet valve 210 are to be positioned based on signals from the engine sensor(s) 235. In turn, the ACC processor circuitry 202 can cause the first actuator(s) 204 and the second actuator(s) 208 to modulate the angular orientation of the respective vanes based on the determined angular orientation. Furthermore, the ACC processor circuitry 202 can generate and transmit a signal to the third actuator(s) 212 to cause the third actuator(s) 212 to adjust a position of the mid-pipe valve 214 and, in turn, adjust a rate at which the air flows towards the manifolds 220A, 220B, 220C in the first pipe 205 based on the signals from the engine sensor(s) 235.

In some examples, because there is a temperature difference between the air in the fan section 201 or the bypass airflow passage 203 and the compressor section 209, the ACC processor circuitry 202 determines that the air from the fan section 201 and/or the bypass airflow passage 203 is to be provided to the flanges 225A, 225B and the mid-rings 230A, 230B at a first rate and determine that the air from the compressor section 209 is to be provided to the flanges 225A, 225B and the mid-rings 230A at a second rate. Thus, the ACC processor circuitry 202 can configure the first inlet valve 206 and the second inlet valve 210 differently to control a temperature and flow rate of the air encountered by the flanges 225A, 225B and the mid-rings 230A for improved blade tip clearance control in the high-pressure turbine 211 and/or the low-pressure turbine 215.

Figure 2B:
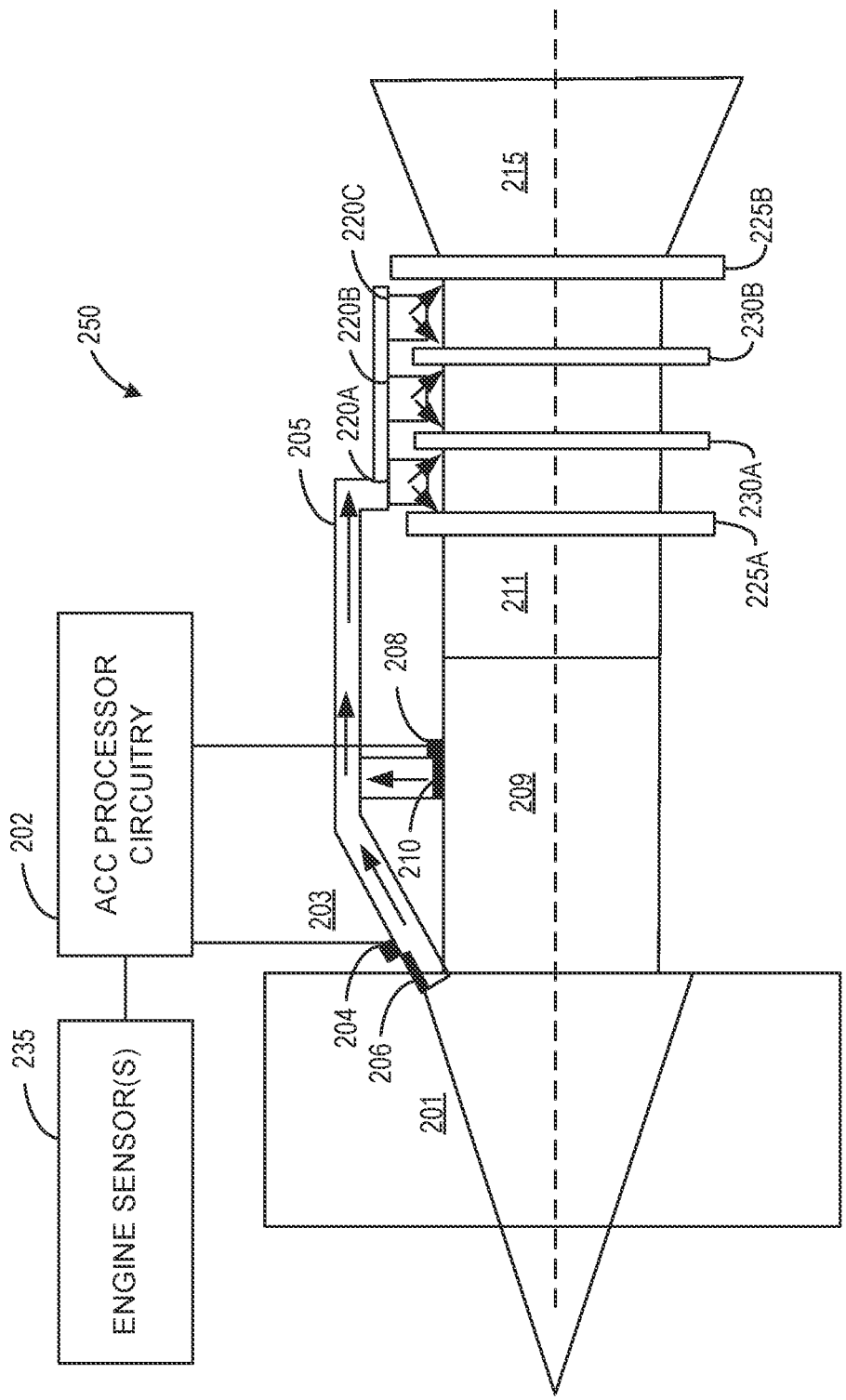
FIG. 2B is a schematic cross-sectional view of a second example ACC system that can be utilized in the gas turbine engine of FIG. 1.
Figure 2C:
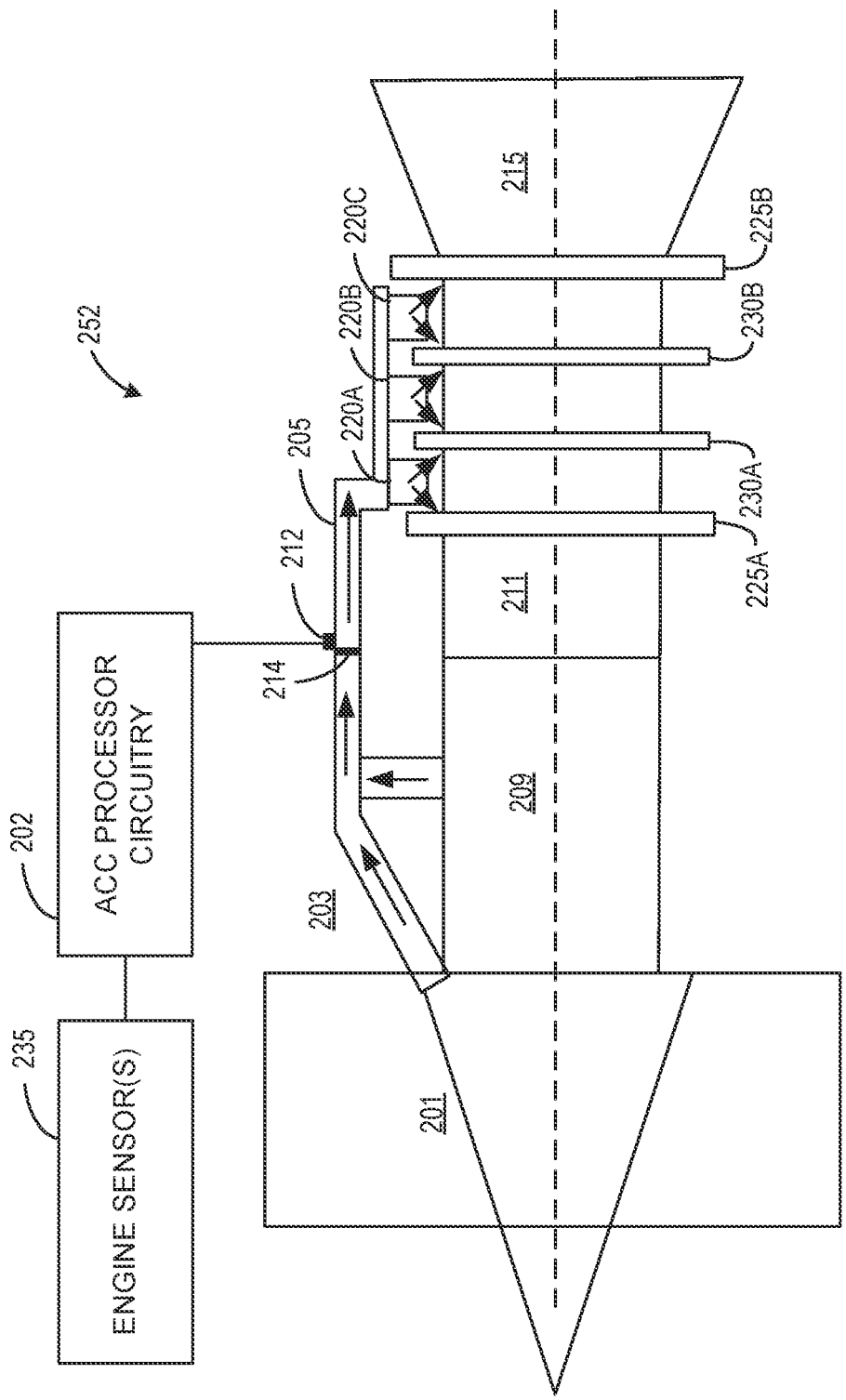
FIG. 2C is a schematic cross-sectional view of a third example ACC system that can be utilized in the gas turbine engine of FIG. 1.

Although the illustrated example of FIG. 2A depicts the ACC system 200 having the first inlet valve 206, the second inlet valve 210, and the mid-pipe valve 214, other example ACC systems may include one or more of the first inlet valve 206, the second inlet valve 210, and/or the mid-pipe valve 214. To that end, FIG. 2B illustrates a second example ACC system 250 including the first inlet valve 206 and the second inlet valve 210 to control the rate at which the air flows in the first pipe 205 towards the manifolds 220A, 220B, 220C. Further, FIG. 2C illustrates a third example ACC system 252 including the mid-pipe valve 214 to control the rate at which the air flows in the first pipe 205 towards the manifolds 220A, 220B. 220C.

Figure 2D:
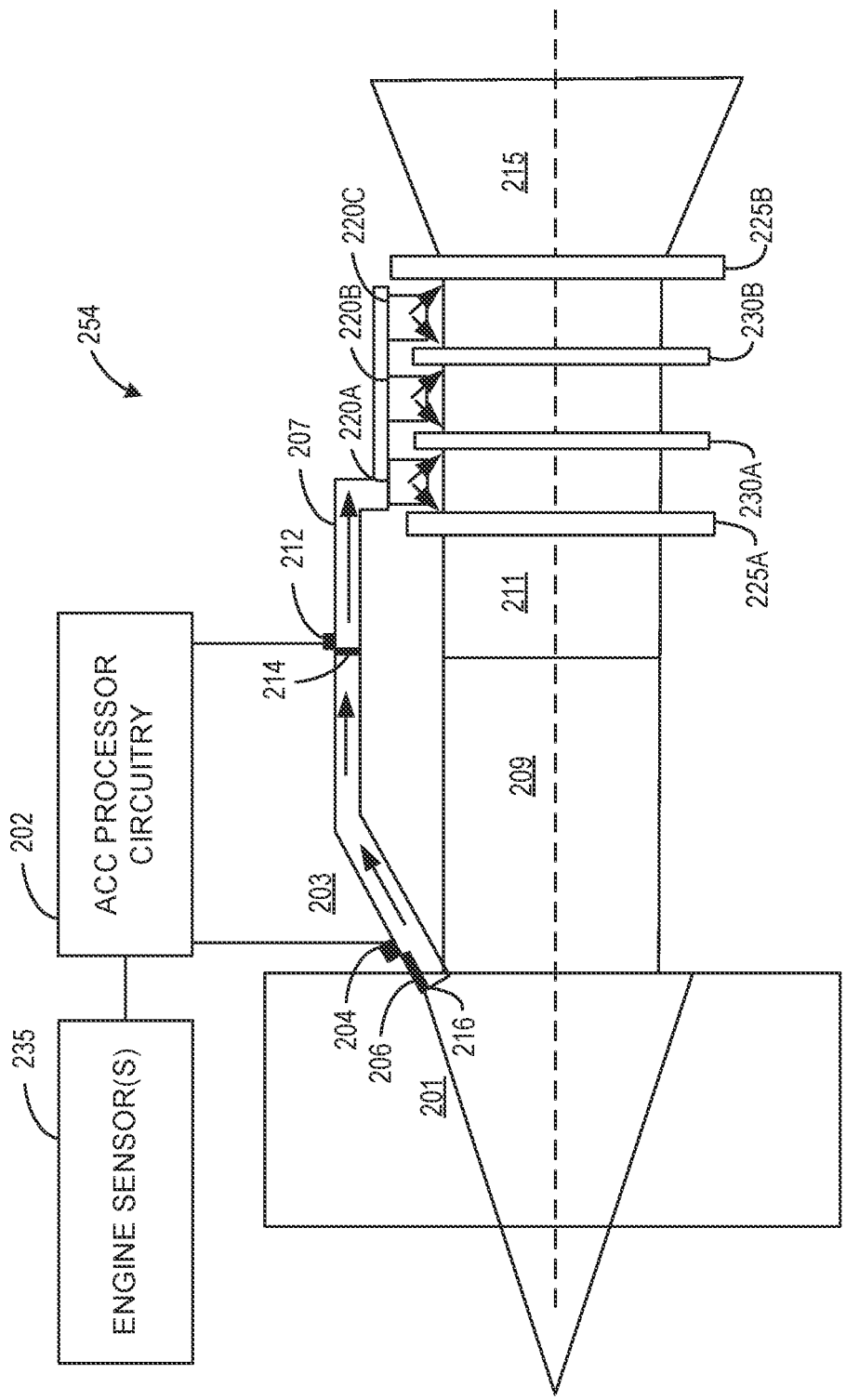
FIG. 2D is a schematic cross-sectional view of a fourth example ACC system that can be utilized in the gas turbine engine of FIG. 1.
Figure 2E:
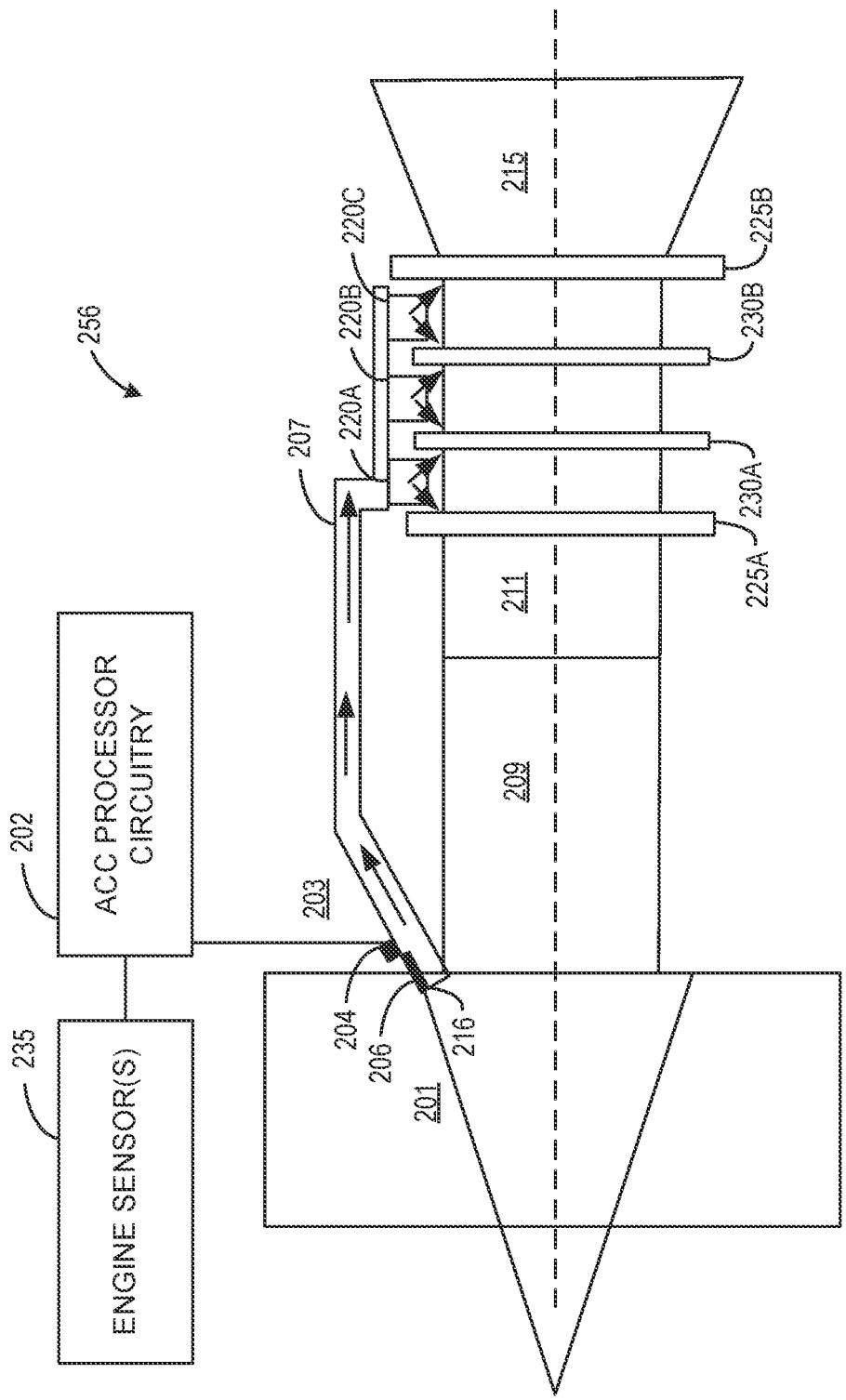
FIG. 2E is a schematic cross-sectional view of a fifth example ACC system that can be utilized in the gas turbine engine of FIG. 1.
Figure 2F:
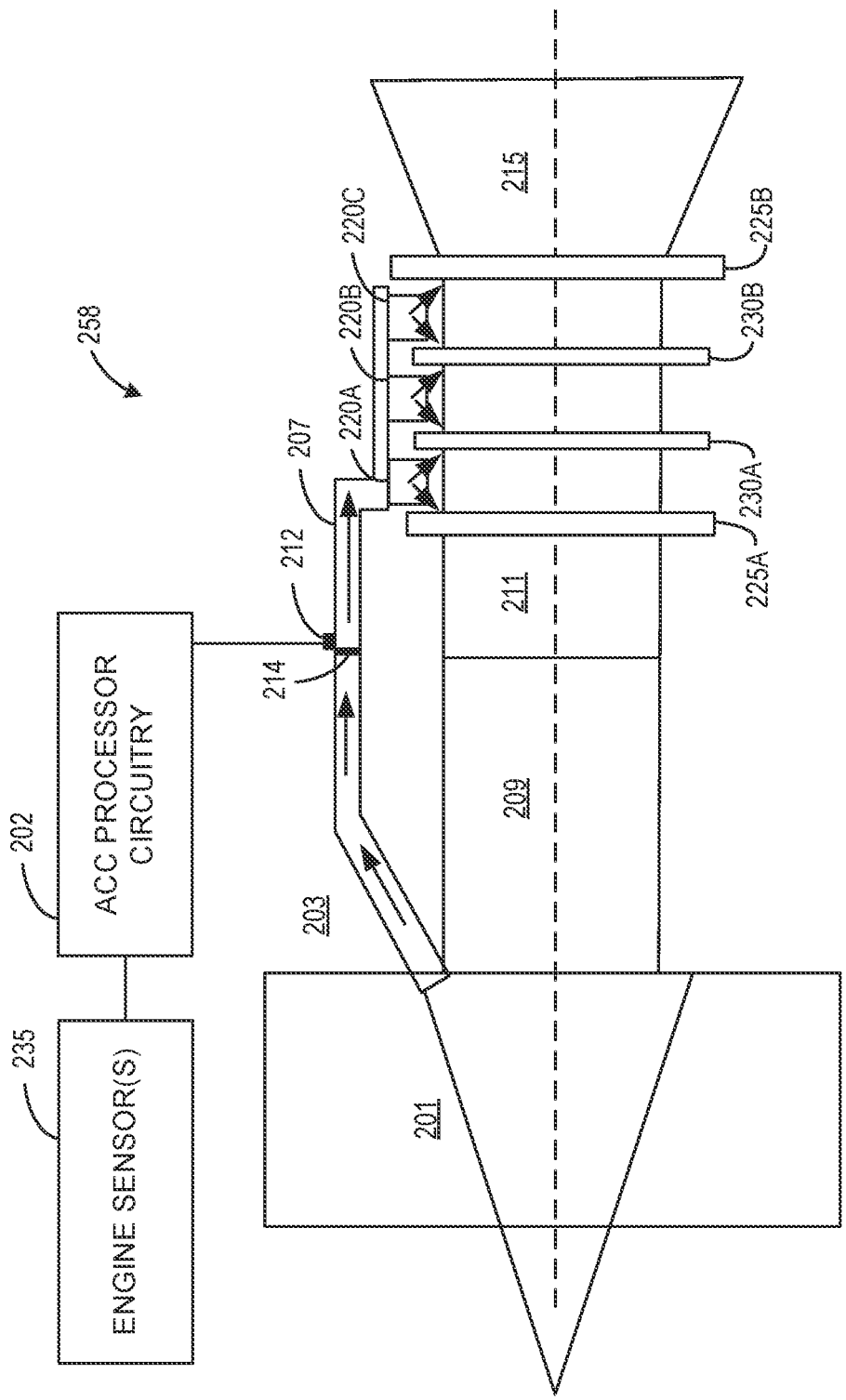
FIG. 2F is a schematic cross-sectional view of a sixth example ACC system that can be utilized in the gas turbine engine of FIG. 1.

Additionally, although the illustrated example of FIG. 2A depicts the first pipe 205 having two inlets 216, 218, it should be understood that examples disclosed herein can be implemented in an ACC system having a different pipe with any number of inlets and/or inlet valves (e.g., no inlet valve, the first inlet valve 206, the second inlet valve 210, etc.). To that end, FIG. 2D illustrates a fourth example ACC system 254 including a second example pipe 207 including the first inlet valve 206 and the mid-pipe valve 214 to control the rate at which the air flows in the second pipe 207 towards the manifolds 220A, 220B, 220C. Additionally, FIG. 2E illustrates an fifth example ACC system 256 including the first inlet valve 206 positioned at the first inlet 216 of the second pipe 207 to control the rate at which the air flows in the second pipe 207 towards the manifolds 220A, 220B, 220C. Furthermore, FIG. 2F illustrates a sixth example ACC system 258 including the mid-pipe valve 214 positioned in the second pipe 207 to control the rate at which the air flows in the second pipe 207 towards the manifolds 220A, 220B, 220C.

Figure 3A:
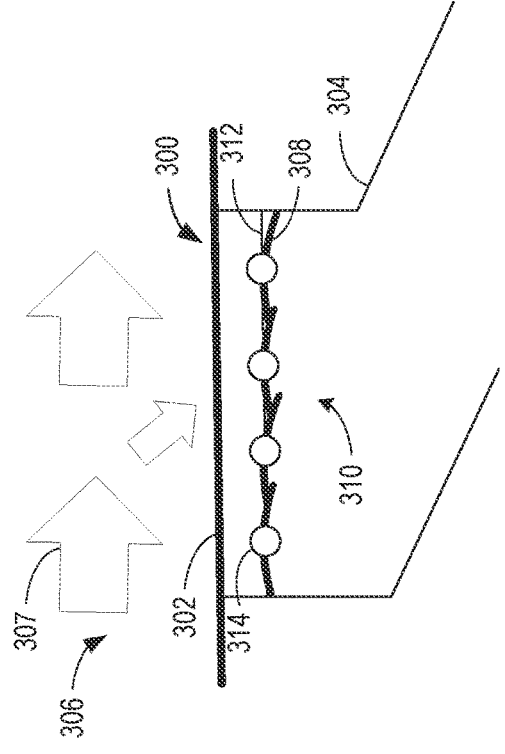
FIG. 3A illustrates an example inlet valve associated with the ACC system(s) of FIGS. 2A, 2B, 2D, and/or 2E in a first example position.

FIG. 3A illustrates an example inlet valve 300 (e.g., the first inlet valve 206, the second inlet valve 210) in an example closed position 310. The inlet valve 300 is positioned at an example inlet 302 (e.g., the first inlet 216, the second inlet 218) of a conduit 304 (e.g., the first pipe 205, the second pipe 207). The inlet valve 300 defines a border between an airflow passage 306 (e.g., the airflow passage of the fan section 201, the bypass airflow passage 203, the airflow passage of the compressor section 209, etc.) and the conduit 304. In the illustrated example of FIG. 3A, direction of the airflow in the airflow passage 306 is depicted by arrows 307.

In the illustrated example of FIG. 3A, the inlet valve 300 includes vanes 308 operatively coupled to a rod 312 (e.g., a rail, a bar, a rack, etc.) and a shaft 314. In some examples, the inlet valve 300 includes the rod 312 or the shaft 314 (i.e., not both). The vanes 308 define a cross-sectional area through which air from the airflow passage 306 can enter the conduit 304 through the inlet 302. As such, a flow rate of the air in the conduit 304 corresponds to a position of the vanes 308. As the inlet valve 300 is in the closed position 310 in the illustrated example of FIG. 3A, adjacent vanes 308 contact each other. Specifically, the vanes 308 cover a first cross-sectional area of the inlet 302 (e.g., approximately an entire cross-sectional area of the inlet 302) such that the flow rate of the air entering through the inlet 302 is approximately zero.

In some examples, the rod 312 is operatively coupled to the vanes 308. In some examples, the rod 312 is coupled to a midsection of the vanes 308. In some examples, the rod 312 is operatively coupled to ends of the respective vanes 308 outside the inlet 302 to avoid interference with the airflow that enters the conduit 304. In some examples, the rod 312 extends through respective midsections of the vanes 308 in the airflow direction 307 (e.g., through an area defined by the inlet 302). In some examples, the rod 312 can be coupled to edges of the respective vanes 308.

In some examples, the shafts 314 are operatively coupled to respective ones of the vanes 308. In some examples, the respective shafts 314 extend longitudinally through the vanes 308. For example, the shafts 314 can be substantially perpendicular to the rod 312 and/or the airflow direction 307. In some examples, the respective shafts 314 define rotational axes of the respective vanes 308.

In some examples, a position of the rod 312 defines an angular orientation of the vanes 308. Similarly, a rotational position of the shafts 314 can define the angular orientation of the vanes 308. In some examples, a movement of the rod 312 can cause the shafts 314 to rotate, which rotates the vanes 308. In some examples, the movement of the rod 312 causes the respective vanes 308 to rotate without the shafts 314. Accordingly, the linear movement of the rod 312 can increase or decrease an angular displacement of the vanes 308 relative to the inlet 302. In other words, movement of the rod 312 in a first direction can pull the vanes 308 towards the closed position 310, and linear movement of the rod 312 in a second direction can push the vanes 308 towards an open position, as discussed in association with FIGS. 3B, 3C. In some examples, the rotation of the shafts 314 can occur without the movement of the rod 312. For example, the shafts 314 can be rotated directly to adjust the angular displacement of the vanes 308.

In the illustrated example of FIG. 3A, one or more actuator(s) (e.g., the first actuator(s) 204 of FIGS. 2A, 2B, 2D, 2E, the second actuator(s) 208 of FIGS. 2A, 2B) can move the rod 312 and/or the shafts 314 to control the angular orientation of the vanes 308 and, thus, the flow rate of the air entering the conduit 304. In the illustrated example, the actuator(s) can cause the rod 312 and/or the respective shafts 314 to move to a first position to cause the vanes 308 to move to a first angular orientation corresponding to the closed position 310. In some examples, the actuator(s) rotate the vanes 308 via another mechanical linkage. For example, the inlet valve 300 can include a 4-bar linkage having a first bar fixedly coupled to a midsection of the vanes 308 at an outer edge of the vanes 308, a second bar movably coupled to a top or bottom portion of the vanes 308, and a third and fourth bar couple ends of the first bar to ends of the second bar. In such examples, the actuator(s) can move the second bar or pivot the third bar and/or the fourth bar to cause the vanes 308 to rotate.

Figure 3C:
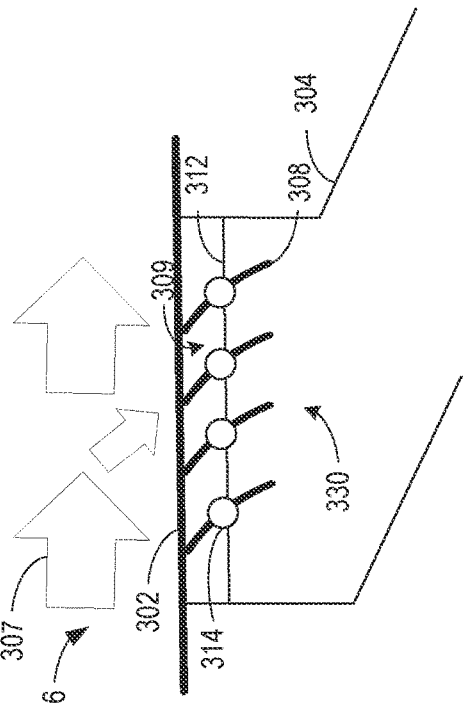
FIG. 3C illustrates the example inlet valve of FIGS. 3A and 3B in a third example position.
Figure 3B:
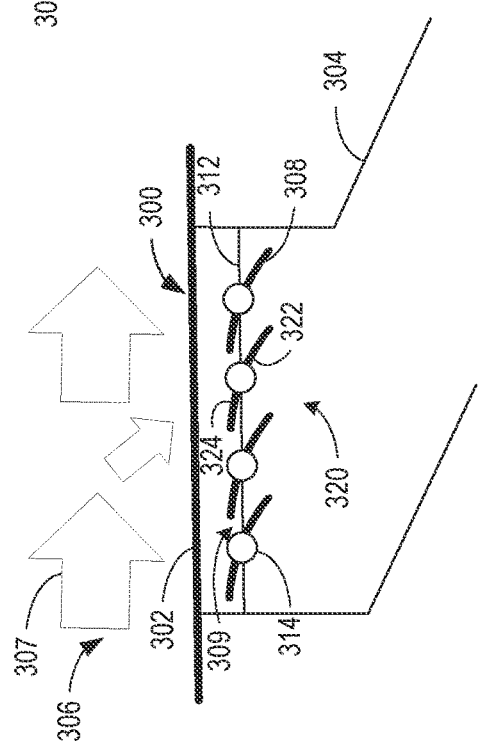
FIG. 3B illustrates the example inlet valve of FIG. 3A in a second example position.

FIG. 3B illustrates the example inlet valve 300 in a first example open position 320 (e.g., a partially open position). In the illustrated example of FIG. 3B, the actuator(s) cause the rod 312 and/or the respective shafts 314 to move to a second position to cause the vanes 308 to move to a second angular orientation corresponding to the first open position 320. The second angular orientation of the vanes 308 covers a second cross-sectional area of the inlet 302. Specifically, in the second angular orientation, adjacent ones of the vanes 308 are separated to define slots 309 corresponding to a first open area at the inlet 302 through which the air from the airflow passage 306 can flow into the conduit 304. Although the illustrated example includes the rod 312 and/or the respective shafts 314 to adjust the position of the vanes, the inlet valve 300 can include any other mechanical linkage to adjust the position of the vanes.

In the illustrated example of FIG. 3B, the respective vanes 308 include a first face 322 (e.g., an upstream face) and a second face 324 (e.g., a downstream face) opposite the first face 322. To minimize or otherwise reduce turbulence or drag that the air encounters as a result of flowing through the inlet valve 300, the first face 322 and the second face 324 are curved. Specifically, the first face 322 is defined by a concave curvature, and the second face 324 is defined by a convex curvature.

FIG. 3C illustrates the example inlet valve 300 in a second example open position 330 (e.g., a second partially open position, a fully open position). In the illustrated example, the actuator(s) cause the rod 312 and/or the respective shafts 314 to move to a third position to cause the vanes 308 to move to a third angular orientation corresponding to the second open position 330. In the illustrated example of FIG. 3C, the third angular orientation of the vanes 308 covers a third cross-sectional area of the inlet 302. As a result, the vanes 308 increase a size of the slots 309 through which the air from the airflow passage 306 can enter the conduit 304. In some examples, when the vanes 308 are in the third angular orientation, an edge of the vanes 308 extend to a plane defined by the inlet 302. Although the illustrated example includes the rod 312 and/or the respective shafts 314 to adjust the position of the vanes 308, the inlet valve 300 can include any other mechanical linkage to adjust the position of the vanes.

FIGS. 4A-4B illustrate another example inlet valve 400 (e.g., the first inlet valve 206, the second inlet valve 210, the inlet valve 300). Specifically, FIG. 4A illustrates the inlet valve 400 in a first example linear position 401, and FIG. 4B illustrates the inlet valve in a second example linear position 403.

Similar to FIGS. 3A-3C, in FIGS. 4A-4B, the inlet valve 400 includes the vanes 308 operatively coupled to the rod 312 to define a cross-sectional area through which air from the airflow passage 306 can enter the conduit 304 through the inlet 302. In some examples, the vanes 308 are operatively coupled to the rod 312, the shafts 314 of FIGS. 3A-C, and/or another mechanical linkage to enable adjustments to an angular orientation of the vanes 308, as discussed above in association with FIGS. 3A-C.

In the illustrated examples of FIGS. 4A-4B, the inlet valve 400 includes a first linear actuator 402 (e.g., at least a portion of the first actuator(s) 204 of FIGS. 2A, 2B, 2D, 2E, at least a portion of the second actuator(s) 208 of FIGS. 2A, 2B) operatively coupled to a first end (e.g., an upstream end) of the rod 312. Further, the inlet valve 400 includes a second linear actuator 404 (e.g., at least a portion of the first actuator(s) 204 of FIGS. 2A, 2B, 2D, 2E, at least a portion of the second actuator(s) 208 of FIGS. 2A, 2B) operatively coupled to a second end (e.g., a downstream end) of the rod 312. In the illustrated example of FIGS. 4A-4B, the first linear actuator 402 and the second linear actuator 404 enable the rod 312 and, in turn, the vanes 308 to move linearly towards or away from the airflow passage 306. As such, the first linear actuator 402 and the second linear actuator 404 enable the vanes 308 to protrude into the airflow passage 306, as shown in the illustrated example of FIG. 4B. In FIG. 4B, by protruding into the airflow passage 306, the vanes 308 can guide more of the air flowing through the airflow passage 306 into the conduit 304 to increase a flow rate of the air flowing through the conduit 304. In other words, air in the airflow passage 306 that would otherwise flow over the inlet valve 400 contacts the vanes 308, which guide the air into the conduit 304. As a result, the inlet valve 40 enables the air to contact the flanges 225A, 225B of FIGS. 2A-2F and the mid-rings 230A of FIGS. 2A-2F at an increased rate to counteract a thermal expansion of the flanges 225A, 225B and the mid-rings 230A and maintain a certain blade tip clearance in the high-pressure turbine 211 and/or the low-pressure turbine 215. Advantageously, the inlet valve 400 enables ACC systems 200, 252, 254, 256, 258 of FIGS. 2A-2F to control blade clearances in the high-pressure turbine 211 and/or the low-pressure turbine 215 with less reliance on a flow rate of the air in the airflow passage 306.

FIGS. 5A-5B illustrate another example inlet valve 500 (e.g., the first inlet valve 206, the second inlet valve 210, the inlet valve 300). Specifically, FIG. 5A illustrates the inlet valve 500 in a first pivot position 501, and FIG. 5B illustrates the inlet valve 500 in a second pivot position 503.

Similar to FIGS. 3A-3C, in FIGS. 5A-5B, the inlet valve 500 includes the vanes 308 operatively coupled to the rod 312 to define a cross-sectional area through which air from the airflow passage 306 can enter the conduit 304 through the inlet 302. In some examples, the vanes 308 are operatively coupled to the rod 312, the shafts 314 of FIGS. 3A-C, and/or another mechanical linkage to enable adjustments to an angular orientation of the vanes 308, as discussed above in association with FIGS. 3A-C.

In the illustrated examples of FIGS. 5A-5B, the inlet valve 500 includes a pivot joint 502 operatively coupled to a first end (e.g., an upstream end) of the rod 312 and an actuator 504 (e.g., at least a portion of the first actuator(s) 204 of FIGS. 2A, 2B, 2D, 2E, at least a portion of the second actuator(s) 208 of FIGS. 2A, 2B) operatively coupled to a second end (e.g., a downstream end) of the rod 312.

In the illustrated examples of FIGS. 5A-5B, the actuator 504 can cause the rod 312 to pivot about the pivot joint 502. In some examples, the actuator 504 causes the second end of the rod 312 to move in a curved path as the rod 312 pivots about the pivot joint 502. In turn, the vanes 308 can revolve around the pivot joint 502 such that at least one of the vanes 308 protrude(s) into the airflow passage 306. In particular, the actuator 504 causes one or more downstream vanes 308 to extend an increased distance into the airflow passage 306 relative to upstream ones of the vanes 308. For example, a first vane 506 defined downstream of a second vane 508 can extend a first distance D1 past the inlet 302 while the second vane 508 extends a second distance D2 past the inlet 302. Accordingly, the vanes 308 can increasingly extend into the airflow passage 306 to deflect different portions of the air flowing through the airflow passage 306 into the conduit 304.

Figure 6A:
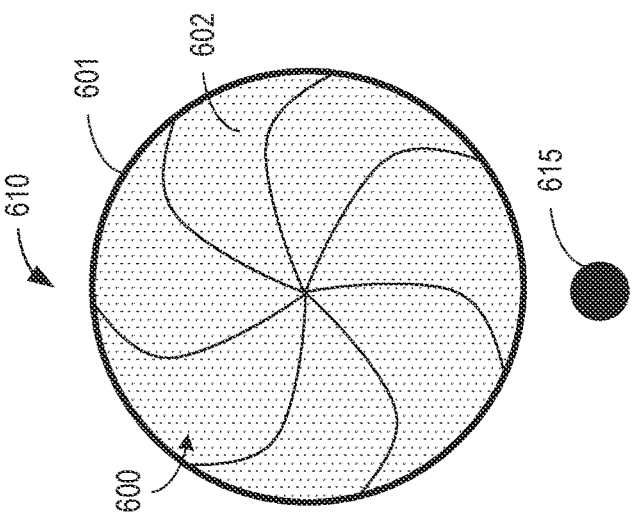
FIG. 6A illustrates an example mid-pipe valve associated with the ACC system(s) of FIGS. 2A, 2C, 2D. and/or 2F in a first example position.
Figure 6B:
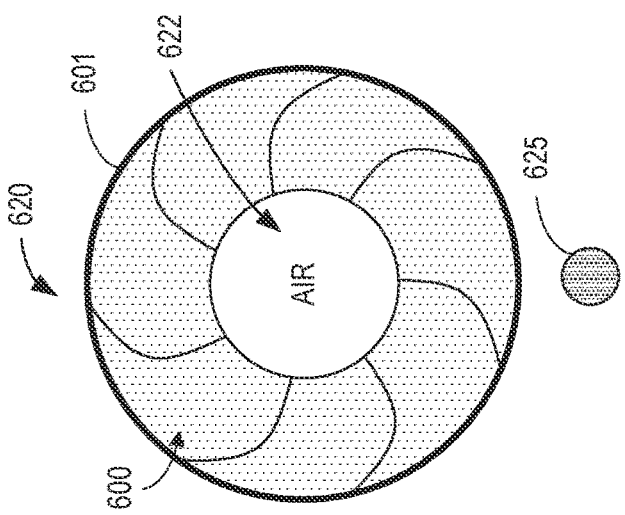
FIG. 6B illustrates the example mid-pipe valve of FIG. 6A in a second example position.
Figure 6C:
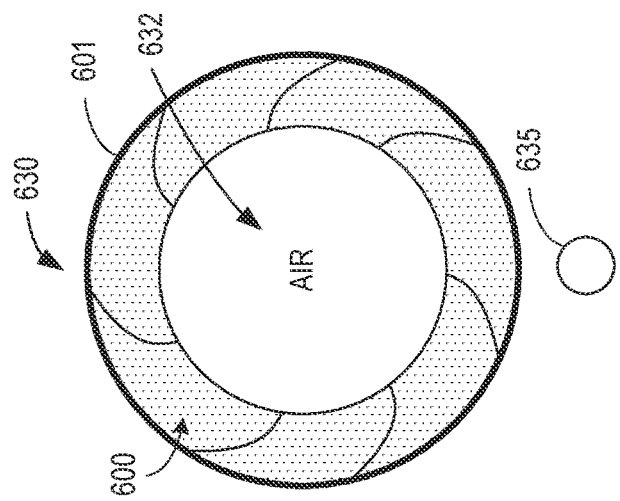
FIG. 6C illustrates the example mid-pipe valve of FIGS. 6A and 6B in a third example position.

FIGS. 6A-6C illustrate an example mid-pipe valve 600 (e.g., the mid-pipe valve 214 of FIGS. 2A, 2C, 2D, 2F) positioned in a conduit 601 (e.g., the first pipe 205 of FIGS. 2A-2C, the second pipe 207 of FIGS. 2D-2F). Specifically, FIG. 6A illustrates the mid-pipe valve 600 in an example closed position 610. FIG. 6B illustrates the mid-pipe valve 600 in a first example open position 620 (e.g., a first partially open position). FIG. 6C illustrates the example mid-pipe valve 600 in a second example open position 630 (e.g., a second partially open position).

In the illustrated examples of FIGS. 6A-6C, the mid-pipe valve 600 defines a cross-sectional area through which air can flow through the conduit 601. For example, the mid-pipe valve 600 can include swing wings 602, and the swing wings 602 can move to open a flow path in the conduit 601, as discussed further in association with FIGS. 7A-7B.

When the mid-pipe valve 600 is in the closed position 610 of FIG. 6A, the swing wings 602 extend to, and overlap at, a middle of the conduit 601 to close the flow path and minimize or otherwise reduce a flow rate through the conduit 601. In FIG. 6A, a first dot 615 is representative of a first flow rate of the air flowing through the conduit 601 when mid-pipe valve 600 is in the closed position 610, as discussed further in association with FIG. 8A.

When the mid-pipe valve 600 is in the first open position 620 of FIG. 6B, the swing wings 602 are at least partially rotated and/or retracted to define a first opening 622 through which the air in the conduit 601 can flow. For example, the first opening 622 can define approximately 30% of a cross-sectional area of the conduit 601. In FIG. 6B, a second dot 625 is representative of a second flow rate of the air flowing through the conduit 601 when the mid-pipe valve 600 is in the first open position 620, as discussed further in association with FIG. 8A.

In some examples, the first opening 622 is approximately circular to reduce turbulence in the conduit 601 as air flows through the first opening 622. As such, the mid-pipe valve 600 enables the flow rate in the conduit 601 to increase linearly as the swing wings 602 increase an open area in the conduit 601 (e.g., the first opening 622). That is, the flow rate in the conduit 601 linearly increases as the swing wings 602 move from the closed position 610 to the first open position 620. Moreover, the air can flow through an entirety of the first opening 622 to maximize or otherwise increase an efficiency and/or a predictability of airflow through the mid-pipe valve 600.

On the other hand, when an ACC system includes a butterfly valve, the butterfly valve causes turbulence at least partially dependent on an associated angular orientation. Accordingly, the butterfly valve causes the flow rate to increase or decrease non-linearly as a result of positional adjustments, as discussed further in association with FIG. 8B. Moreover, even when fully opened, the butterfly valve is unable to completely clear the conduit, which results in a reduced maximum flow rate capability. As such, the mid-pipe valve 600 increases a maximum flow rate through the conduit 601 and improves a predictability of flow rates associated with respective positions of the mid-pipe valve 600.

When the mid-pipe valve 600 is in the second open position 630 of FIG. 6C, the swing wings 602 are further rotated and/or retracted to define a second opening 632 through which the air in the conduit 601 can flow. For example, the second opening 632 can define approximately 70% of the cross-sectional area of the conduit 601. In FIG. 6C, a third dot 635 is representative of a third flow rate of the air flowing through the conduit 601 when the mid-pipe valve 600 is in the second open position 630, as discussed further in association with FIG. 8A. The flow rate in the conduit 601 linearly increases as the swing wings 602 move from the first open position 620 to the second open position 630.

Figure 7B:
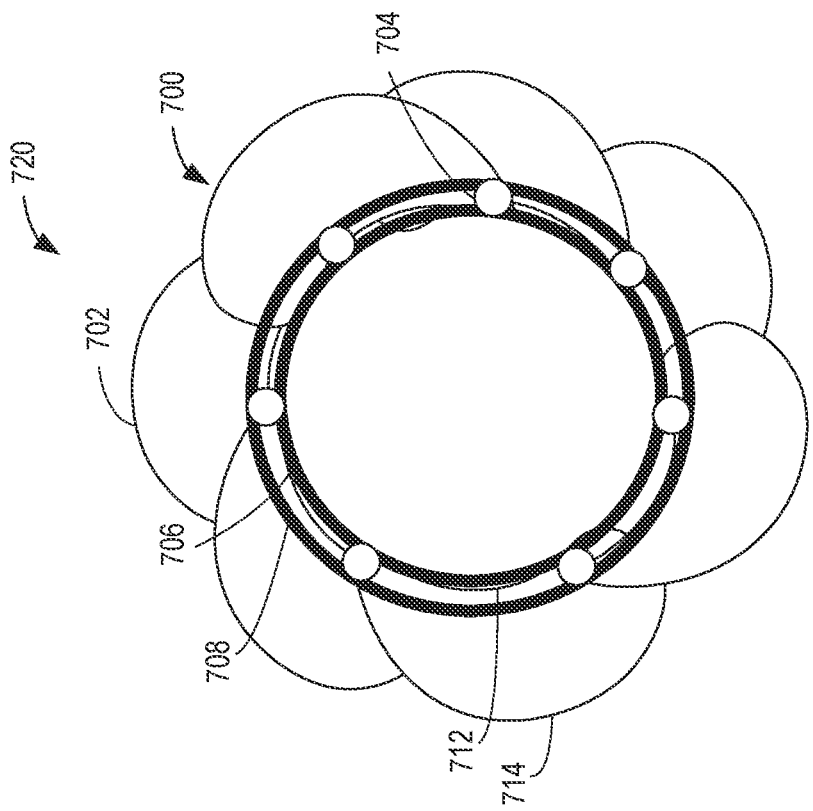
FIG. 7B illustrates the example mid-pipe valve of FIG. 7A in a second example position.
Figure 7A:
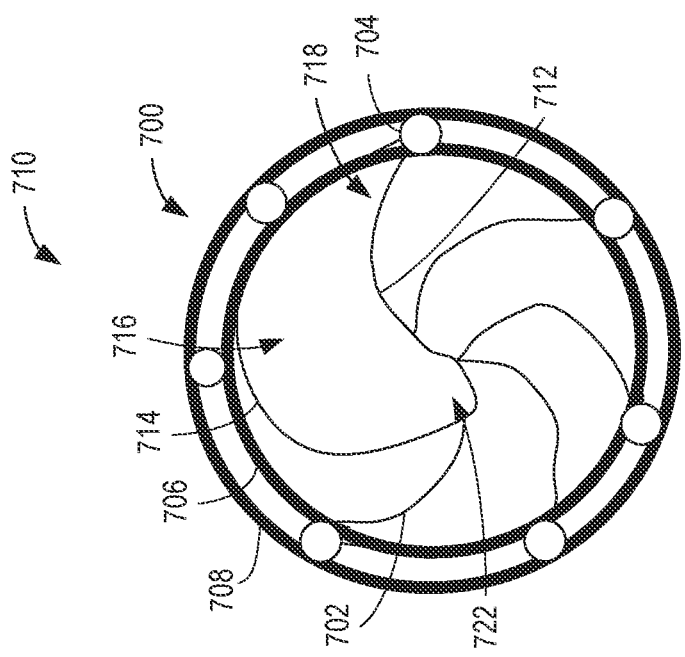
FIG. 7A illustrates another example mid-pipe valve associated with the ACC system(s) of FIGS. 2A, 2C, 2D. and/or 2F in a first example position.

FIGS. 7A-7B illustrate an example mid-pipe valve 700. Specifically, the mid-pipe valve 700 is an example implementation of the mid-pipe valve 600 of FIGS. 6A-6C and/or the mid-pipe valve 214 of FIGS. 2A, 2C, 2D, 2F. FIG. 7A illustrates the example mid-pipe valve 700 in an example closed position 710. FIG. 7B illustrates the example mid-pipe valve 700 in an example open position 720 (e.g., a fully open position).

In the illustrated examples of FIGS. 7A-7B, the mid-pipe valve 700 includes swing wings 702 (e.g., the swing wings 602 of FIGS. 6A-6C), pivot joints 704, an inner hoop 706 (e.g., an inner radial bearing), and an outer hoop 708 (e.g., an outer radial bearing). In the illustrated examples of FIGS. 7A-7B, ends of the respective swing wings 702 are coupled to respective ones of the pivot joints 704. Specifically, ends of the respective swing wings 702 (e.g., outer radial ends when the mid-pipe valve 700 is in the closed position 710) are fixedly coupled to the respective pivot joints 704. As such, a rotation of the pivot joints 704 causes the swing wings 702 to rotate about the respective pivot joint 704 to which the respective swing wing 702 is coupled. Thus, the rotation of the pivot joints 704 causes the mid-pipe valve 700 to move from the closed position 710 of FIG. 7A to the open position 720 of FIG. 7B.

In some examples, positions of the respective pivot joints 704 are fixed relative to the inner hoop 706. For example, the inner hoop 706 can include roller bearings positioned on opposite sides of the respective pivot joints 704, and the roller bearings of the inner hoop 706 can rotate when the pivot joints 704 rotate such that the pivot joints 704 remain in place relative to the inner hoop 706. In some examples, the outer hoop 708 rotates to cause the rotation of the pivot joints 704. For example, one or more actuator(s) (e.g., the third actuator(s) 212 of FIGS. 2A, 2C, 2D, 2F) can drive a rotation of the outer hoop 708 to rotate and, in turn, cause the pivot joints 704 to turn the swing wings 702 further into and/or out of a conduit (e.g., the first pipe 205 of FIGS. 2A, 2C, the second pipe 207 of FIGS. 2D, 2F, the conduit 601 of FIGS. 6A-6B) as the mid-pipe valve 700 is adjusted between the closed position 710 of FIG. 7A and the open position 720 of FIG. 7B.

In the illustrated examples of FIGS. 7A-7B, adjacent swing wings 702 overlap. In some examples, the overlap results in a small portion of air flowing past the mid-pipe valve 700 when the mid-pipe valve is in the closed position 710, but such an air bleed through the mid-pipe valve 700 is acceptable in ACC systems (e.g., the ACC systems 200, 252, 254, 256, 258 of FIGS. 2A-2F) because the small portion of air has relatively no impact on the thermal contraction of the flanges 225A, 225B and the mid-rings 230A, 230B. Moreover, the allowable overlap between adjacent swing wings 702 enables the swing wings to be produced with higher tolerances, which reduces manufacturing costs associated with the mid-pipe valve 700.

In the illustrated examples of FIGS. 7A-7B, the swing wings 702 include a first edge 712 (e.g., an inner edge, a trailing edge as the swing wings 702 move from the closed position 710 to the open position 720, etc.) and a second edge 714 (e.g., an outer edge, a leading edge as the swing wings 702 move from the closed position 710 to the open position 720, etc.). To enable the mid-pipe valve 700 to define a circular opening in any partially open position (e.g., the first open position 620 of FIG. 6B, the second open position 630 of FIG. 6C), the first edge 712 includes a concave curvature and the second edge 714 includes a convex curvature. Specifically, the concave curvature of the first edge 712 enables the swing wings 702 to maintain a circular opening as the swing wings are rotated out of the conduit. Furthermore, the convex curvature of the second edge 714 prevents gaps from being encountered between the respective swing wings 702 as the swing wings 702 are rotated between the closed position 710 and the open position 720. To that end, the convex curvature of the second edge 714 causes a middle portion 716 of the swing wings 702 to have a greater width than a first outer portion 718 (e.g., a portion coupled to the pivot joints 704) of the swing wings 702 and a second outer portion 722 (e.g., a portion positioned in the conduit in the closed position 710) of the swing wings 702. In some examples, the second outer portion 722 includes a greater width than the first outer portion 718 to help block the cross-sectional area of the conduit while also enabling the mid-pipe valve 700 to define a circular opening in the conduit. In some other examples, the edges 712, 714 of the swing wings 702 are linear (i.e., do not include curvature).

Figure 8A:
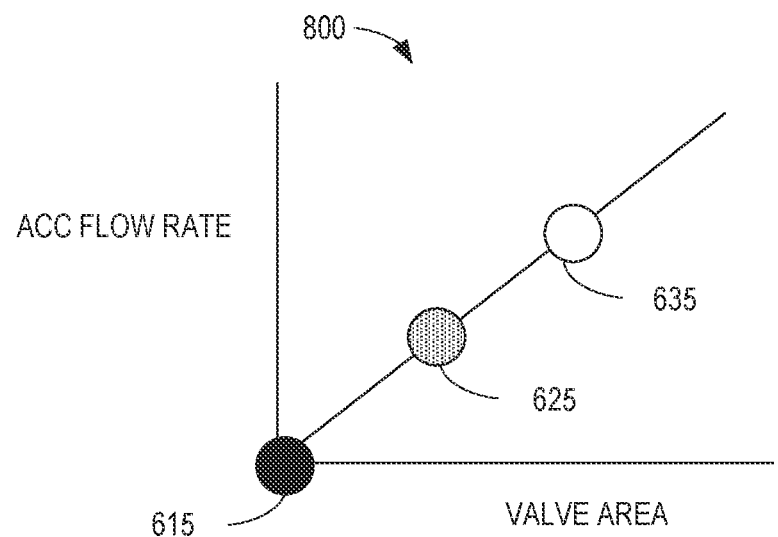
FIG. 8A is a plot of ACC flow rates compared to valve positions associated with valves of the ACC systems of FIGS. 2A-2F.

FIG. 8A is an example plot 800 of example ACC flow rates or radial blade tip clearances and corresponding open valve areas associated with the example mid-pipe valve 600 of FIGS. 6A-6C. As shown, the open valve area linearly increases between the closed position 610 of FIG. 6A, the first open position 620 of FIG. 6B, and the second open position 630 of FIG. 6C of the mid-pipe valve 600. Advantageously, the linear increase in the open valve area defines a linear increase in the ACC flow rate between the respective positions 610, 620, 630 defined by the mid-pipe valve 600. Accordingly, the mid-pipe valve 600 can be implemented with fewer iterations of pre-implementation testing and validation as the slope according to which the ACC flow rate increases with the open valve area is constant and can be established through the positional ranges of the mid-pipe valve 600 with fewer positions being tested and/or validated. Moreover, there is a relatively greater margin for error in the positional adjustments of the valves 600 compared certain positional adjustments of the butterfly valve. Specifically, as shown 8B, a range 852 of positional adjustments of the butterfly valve define a rapidly increasing ACC flow rate and, thus, the position of the butterfly valve is precisely implemented to avoid a meaningful difference between a desired ACC flow rate and an actual ACC flow rate.

In the illustrated example of FIG. 8A, the ACC processor circuitry 202 of FIGS. 2A-2F can determine the radial tip clearance (e.g., the expansion and/or contraction of the flanges 225A, 225B and the mid-rings 230A, 230B) based on signals from the engine sensor(s) 235 of FIGS. 2A-2F. Further, the ACC processor circuitry 202 can determine an open valve area corresponding to the radial tip clearance to determine respective positions in which the mid-pipe valve 600, 700 is to be configured. Accordingly, the ACC processor circuitry 202 can transmit a signal corresponding to the determined positions to the third actuator(s) 212 of FIGS. 2A, 2C, 2D, 2F to cause the positions to be implemented by the mid-pipe valve(s) 214 of FIGS. 2A-2F and, thus, cause the ACC flow rate associated with the current radial tip clearance to be met.

Figure 8B:
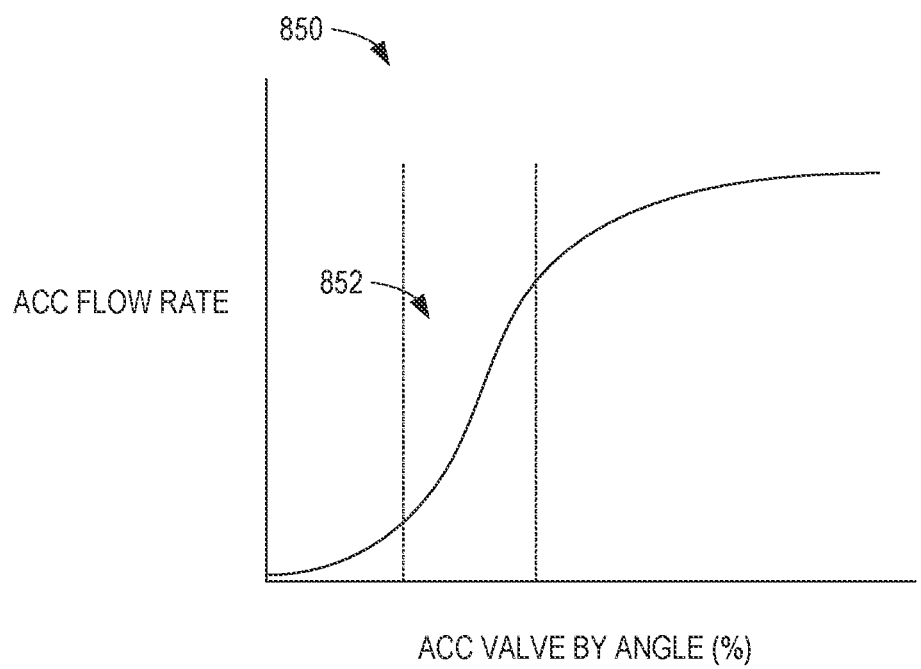
FIG. 8B is a plot of ACC flow rates compared to valve positions of another example ACC valve.

FIG. 8B is an example plot 850 of example ACC flow rates and corresponding open valve areas associated with a butterfly valve. As shown, the open valve area increases non-linearly as an angle of the butterfly valve increases. Furthermore, the non-linear increase occurs rapidly over a certain positional range where the position of the butterfly valve is implemented precisely to obtain a desired ACC flow rate.

Figure 9:
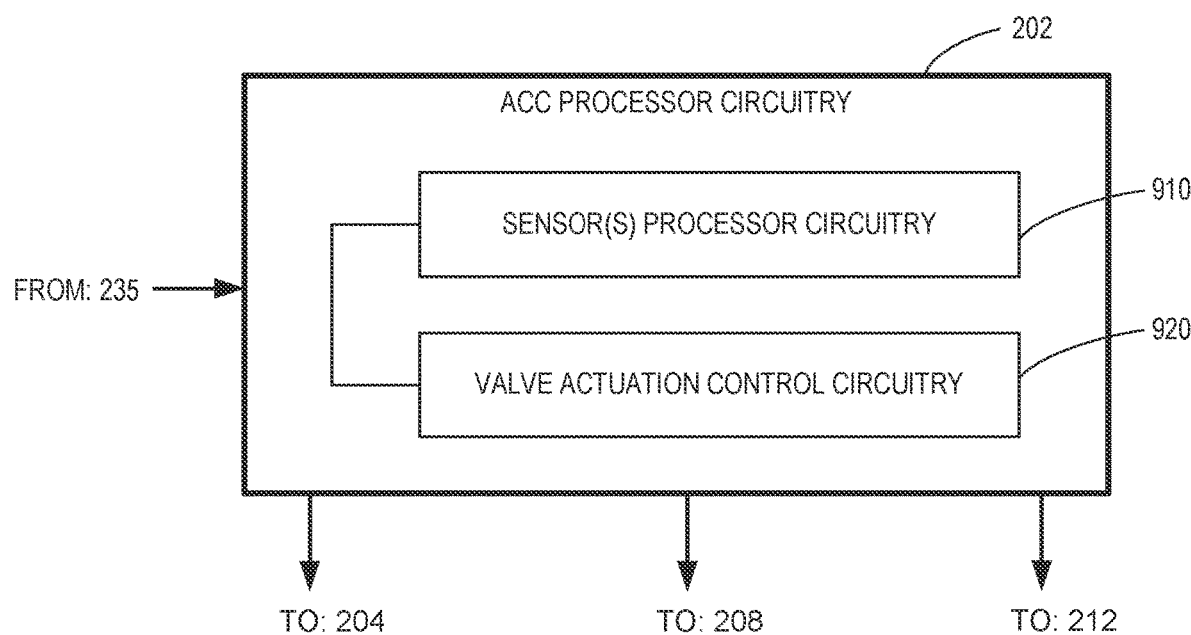
FIG. 9 is a block diagram of example ACC processor circuitry associated with the ACC systems of FIGS. 2A-2F.

FIG. 9 is a block diagram of the ACC processor circuitry 202 of FIGS. 2A-2F to control a rate at which air flows through the first pipe 205 of FIGS. 2A-2C and/or the second pipe of FIGS. 2D-2F to optimize the blade tip clearances in the high-pressure turbine 211 of FIGS. 2A-2F and the low-pressure turbine 215 of FIGS. 2A-2F. The ACC processor circuitry 202 may be instantiated (e.g., creating an instance of, bring into being for any length of time, materialize, implement, etc.) by processor circuitry such as a central processing unit executing instructions. Additionally or alternatively, the ACC processor circuitry 202 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 9 may, thus, be instantiated at the same or different times. Some or all of the circuitry may be instantiated, for example, in one or more threads executing concurrently on hardware and/or in series on hardware. Moreover, in some examples, some or all of the circuitry of FIG. 9 may be implemented by microprocessor circuitry executing instructions to implement one or more virtual machines and/or containers.

In FIG. 9, the ACC processor circuitry 202 can be at least a portion of a FADEC unit, an ECU, an EEC unit, etc., or any other type of data acquisition and/or control computing device, processor platform (e.g., processor-based computing platform), etc. The ACC processor circuitry 202 communicates with the example engine sensor(s) 235 of FIGS. 2A-2F, the first actuator(s) 204, the second actuator(s) 208, and/or the third actuator(s) 212. The ACC processor circuitry 202 includes example sensor(s) processor circuitry 910 and example valve actuation control circuitry 920.

In the illustrated example of FIG. 9, the ACC processor circuitry 202 receives values for a plurality of input variables relating to flight condition (e.g., air density, throttle lever position, engine temperatures, engine pressures, direct clearance measurements, indirect clearance measurements, etc.). Specifically, the ACC processor circuitry 202 receives the flight condition data from the engine sensor(s) 235. The engine sensor(s) 235 can be mounted on the gas turbine engine 100 and/or positioned elsewhere in the aircraft (e.g., on wing, in cockpit, in main cabin, in engine compartment, in cargo, etc.). The communication between the ACC processor circuitry 202 and the engine sensor(s) 235 can be one-way communication and/or two-way communication, for example. The ACC processor circuitry 202 computes engine operating parameters, such as fuel flow, stator vane position, air bleed valve position, etc., using the flight condition data.

In the illustrated example of FIG. 9, the sensor(s) processor circuitry 910 obtains the sensor data from the example engine sensor(s) 235. The sensor data includes the flight condition data obtained from the gas turbine engine 100. The sensor(s) processor circuitry 910 monitors engine conditions based on the sensor data from the engine sensor(s) 235. For example, the sensor(s) processor circuitry 910 can calculate and monitor the fuel flow, stator vane position, air bleed valve position, etc. In some examples, the sensor(s) processor circuitry 910 determines if the turbine case is expanding or shrinking based on the engine conditions determined from the obtained flight condition data. In the illustrated example of FIG. 9, the valve actuation control circuitry 920 generates electrical signals and supplies the electrical signals to the first actuator(s) 204, the second actuator(s) 208, and/or the third actuator(s) 212 of the ACC systems 200, 250, 252, 254, 256, 258. In some examples, the valve actuation control circuitry 920 determines a position(s) in which the first inlet valve 206, the second inlet valve 210, and/or the mid-pipe valve 214 are to be positioned based on the results from sensor(s) processor circuitry 910. In turn, the valve actuation control circuitry 920 can generate and transmit one or more electrical control signals to the first actuator(s) 204, the second actuator(s) 208, and/or the third actuator(s) 212 of the ACC systems 200, 250, 252, 254, 256, 258 based on the determined position(s).

For the example ACC system 200 of FIG. 2A, the valve actuation control circuitry 920 can cause the first actuator(s) 204, the second actuator(s) 208, and/or the third actuator(s) 212 to adjust the position(s) of the first inlet valve 206, the second inlet valve 210, and/or the mid-pipe valve 214, respectively, in response to the sensor(s) processor circuitry 910 determining, based on the signals from the engine sensor(s) 235, that the blade tip clearance in the high-pressure turbine 211 and/or the low pressure turbine is increasing or decreasing. For the example ACC system 250 of FIG. 2B, the valve actuation control circuitry 920 can cause the first actuator(s) 204 and/or the second actuator(s) 208 to adjust the position(s) of the first inlet valve 206 and/or the second inlet valve 210, respectively, in response to the sensor(s) processor circuitry 910 determining, based on the signals from the engine sensor(s) 235, that the blade tip clearance in the high-pressure turbine 211 and/or the low pressure turbine is increasing or decreasing. For the example ACC system 252 of FIG. 2C, the valve actuation control circuitry 920 can cause the third actuator(s) 212 to adjust the position of the mid-pipe valve 214 in response to the sensor(s) processor circuitry 910 determining, based on the signals from the engine sensor(s) 235, that the blade tip clearance in the high-pressure turbine 211 and/or the low-pressure turbine is increasing or decreasing. For the example ACC system 254 of FIG. 2D, the valve actuation control circuitry 920 can cause the first actuator(s) 204 and/or the third actuator(s) 212 to adjust the position(s) of the first inlet valve 206 and/or the mid-pipe valve 214 in response to the sensor(s) processor circuitry 910 determining, based on the signals from the engine sensor(s) 235, that the blade tip clearance in the high-pressure turbine 211 and/or the low pressure turbine is increasing or decreasing. For the example ACC system 256 of FIG. 2E, the valve actuation control circuitry 920 can cause the first actuator(s) 204 to adjust the position of the first inlet valve 206 in response to the sensor(s) processor circuitry 910 determining, based on the signals from the engine sensor(s) 235, that the blade tip clearance in the high-pressure turbine 211 and/or the low-pressure turbine is increasing or decreasing. For the example ACC system 258 of FIG. 2F, the valve actuation control circuitry 920 can cause the third actuator(s) 212 to adjust the position of the mid-pipe valve 214 in response to the sensor(s) processor circuitry 910 determining, based on the signals from the engine sensor(s) 235, that the blade tip clearance in the high-pressure turbine 211 and/or the low-pressure turbine is increasing or decreasing.

In some examples, the valve actuation control circuitry 920 causes the first actuator(s) 204, the second actuator(s) 208, and/or the third actuator(s) 212 to increase an open cross-sectional area(s) defined by the first inlet valve 206, the second inlet valve 210, and/or the mid-pipe valve 214 in response to sensor(s) processor circuitry 910 determining that the blade tip clearance is increasing. In some examples, the valve actuation control circuitry 920 causes the first actuator(s) 204 and/or the second actuator(s) 208 to cause the first inlet valve 206 and/or the second inlet valve 210 to protrude into the adjacent airflow passageway in response to sensor(s) processor circuitry 910 determining that the blade tip clearance is increasing. In some examples, the valve actuation control circuitry 920 causes the first actuator(s) 204, the second actuator(s) 208, and/or the third actuator(s) 212 to decrease the open cross-sectional area(s) defined by the first inlet valve 206, the second inlet valve 210, and/or the mid-pipe valve 214 in response to sensor(s) processor circuitry 910 determining that the blade tip clearance is decreasing. In some examples, the valve actuation control circuitry 920 causes the first actuator(s) 204 and/or the second actuator(s) 208 to cause the first inlet valve 206 and/or the second inlet valve 210 to retract from the adjacent airflow passageway in response to sensor(s) processor circuitry 910 determining that the blade tip clearance is decreasing. In some examples, the valve actuation control circuitry 920 causes the first actuator(s) 204 to operate the first inlet valve 206 different from a manner in which the valve actuation control circuitry 920 causes the second actuator(s) 208 to operate the second inlet valve 210 because a temperature and/or flow rate of the air encountered at the first inlet 216 is different from a temperature and/or flow rate of the air encountered at the second inlet 218.

Figure 10:
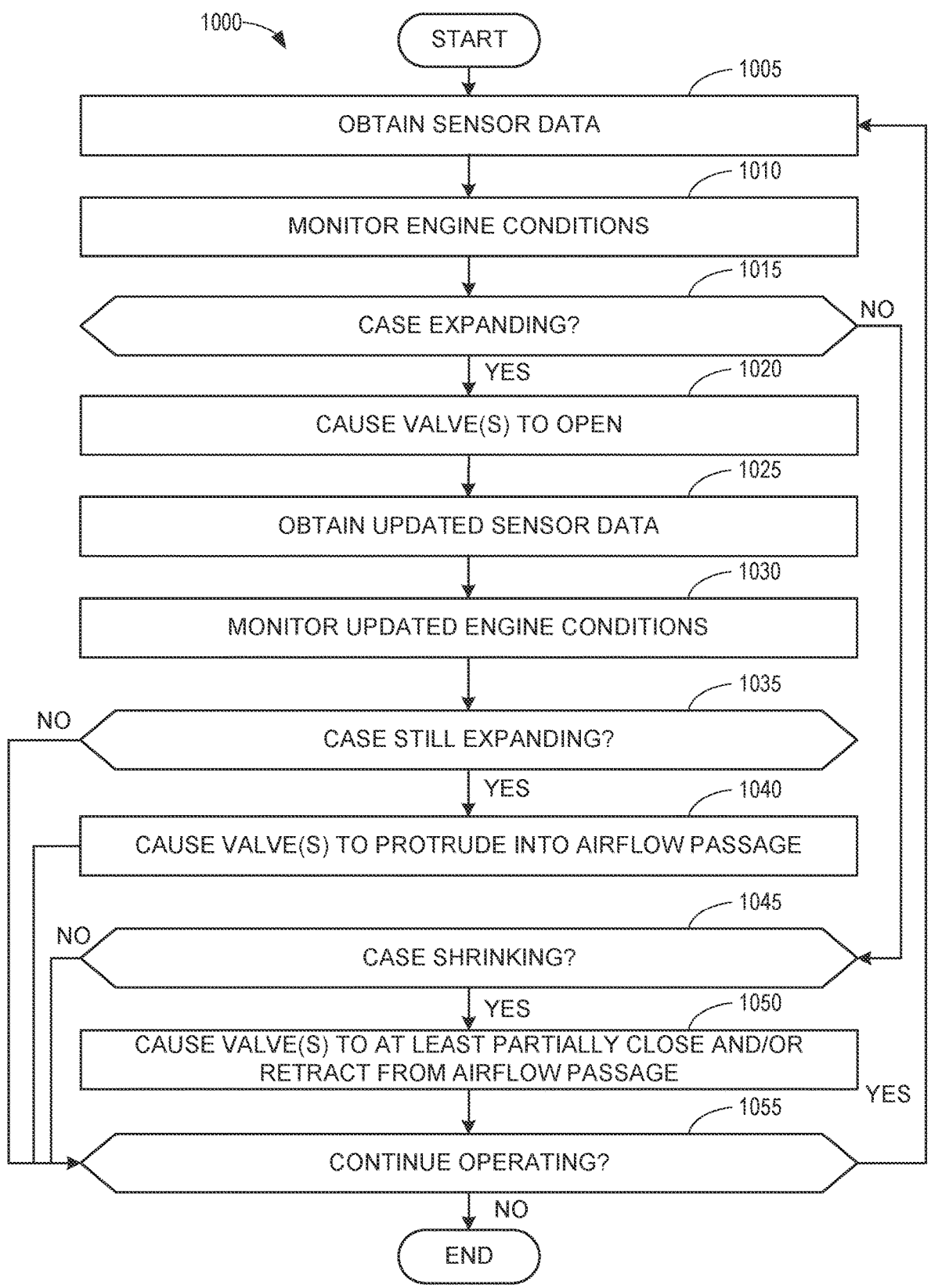
FIG. 10 is a flowchart representative of example machine readable instructions and/or example operations that may be executed by example processor circuitry to implement the example ACC processor circuitry of FIG. 9 in conjunction with the ACC systems of FIGS. 2A, 2B, 2D, and/or 2E.

In some examples, the sensor(s) processor circuitry 910 and/or the valve actuation control circuitry 920 are instantiated by processor circuitry executing sensor processing and actuation controlling instructions, respectively, and/or configured to perform operations such as those represented by the flowcharts of FIGS. 10 and/or 11.

In some examples, the ACC systems 200, 250, 252, 254, 256, 258 of FIGS. 2A, 2B, 2C, 2D, 2E, and/or 2F includes means for routing air from (i) a fan section, a bypass airflow passage, or a compressor section to (ii) a turbine section of the turbine engine. For example, the means for routing air can be implemented by the first pipe 205 of FIGS. 2A-2C and/or the second pipe 207 of FIGS. 2D-2F.

In some examples, the ACC systems 200, 250, 252, 254, 256, 258 of FIGS. 2A. 2B, 2C, 2D, 2E, and/or 2F includes means for defining a cross-sectional area through which the air can flow at least one of into or through the means for routing. For example, the means for defining the cross-sectional area through which the air can flow at least one of into or through the means for routing can be implemented by the first inlet valve 206, the second inlet valve 210, and/or the mid-pipe valve 214. In some examples, the means for defining is implemented by the inlet valve 300, the inlet valve 400, the inlet valve 500, the mid-pipe valve 600, and/or the mid-pipe valve 700.

In some examples, the means for defining the cross-sectional area through which the air can flow into and/or through the means for routing includes means for defining slots at an inlet of the means for routing. For example, the means for defining slots can be implemented by the first inlet valve 206 and/or the second inlet valve 210. In some examples, the means for defining the slots is implemented by the inlet valve 300, the inlet valve 400, and/or the inlet valve 500.

In some examples, the means for defining slots includes means for protruding into the fan section, the bypass airflow passage, or the compressor section. For example, the means for protruding can be implemented by the first inlet valve 206 and/or the second inlet valve 210. In some examples, the means for protruding is implemented by the inlet valve 400, and/or the inlet valve 500.

In some examples, the means for defining the cross-sectional area through which the air can flow into and/or through the means for routing includes means for linearly adjusting a flow rate of the air in the means for routing; the means for linearly adjusting defining a linear relationship between the flow rate and positions of the means for linearly adjusting throughout a positional range of the means for linearly adjusting. For example, the means for linearly adjusting the flow rate can be implemented by the mid-pipe valve 214. In some examples, the means for linearly adjusting the flow rate is implemented by the mid-pipe valve 600 and/or the mid-pipe valve 700.

While an example implementation of the ACC processor circuitry 202 of FIGS. 2A-2F is illustrated in FIG. 9, one or more of the elements, processes, and/or devices illustrated in FIG. 9 may be combined, divided, re-arranged, omitted, eliminated, and/or implemented in any other way. Further, the example sensor(s) processor circuitry 910, the example valve actuation control circuitry 920 and/or, more generally, the example ACC processor circuitry 202 of FIGS. 2A-2F, may be implemented by hardware alone or by hardware in combination with software and/or firmware. Thus, for example, any of the example sensor(s) processor circuitry 910, the example valve actuation control circuitry 920 and/or, more generally, the example ACC processor circuitry 202 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example ACC processor circuitry 202 of FIGS. 2A-2F may include one or more elements, processes, and/or devices in addition to, or instead of, those illustrated in FIG. 9, and/or may include more than one of any or all of the illustrated elements, processes, and devices.

Figure 11:
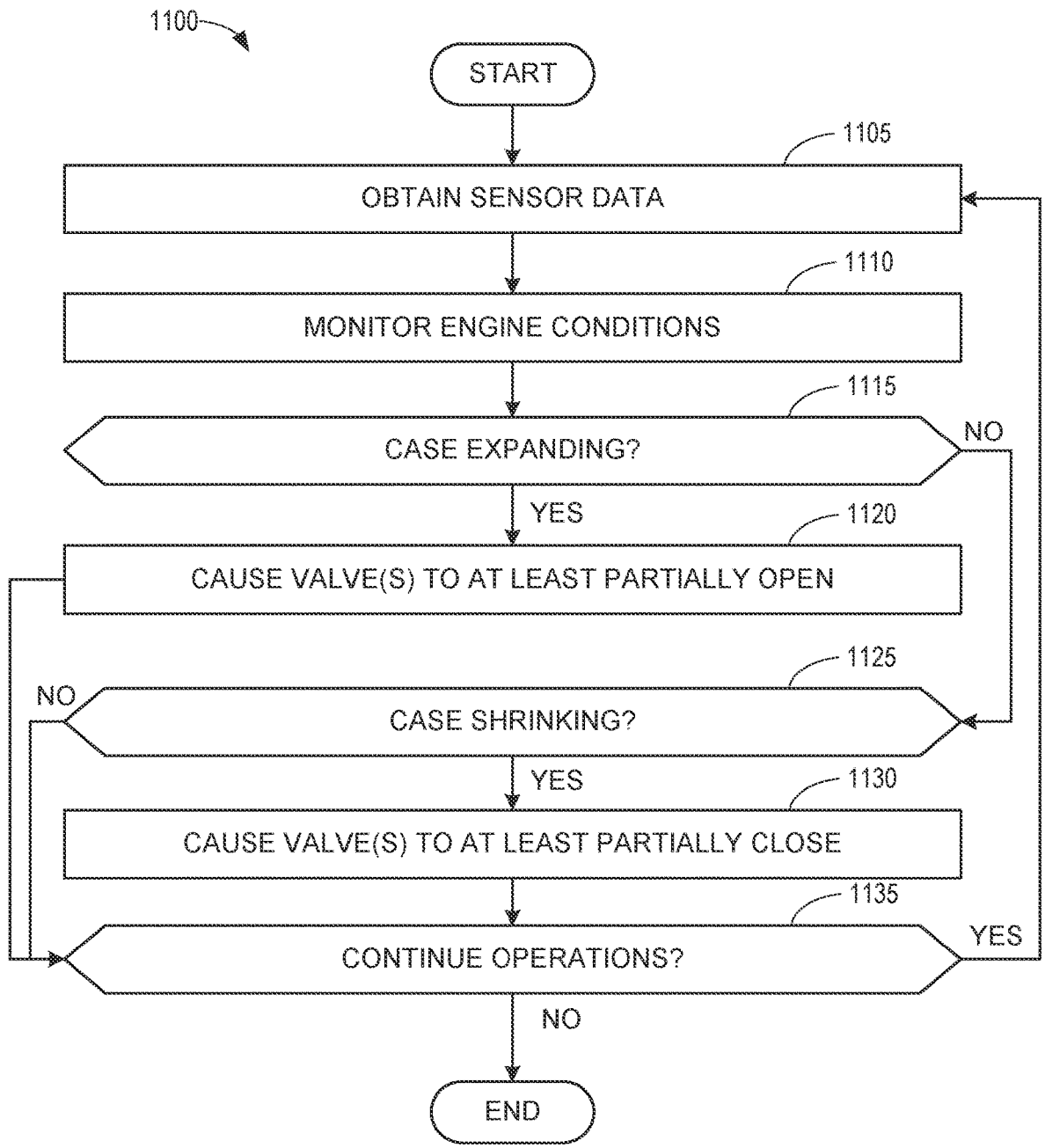
FIG. 11 is a flowchart representative of example machine readable instructions and/or example operations that may be executed by example processor circuitry to implement the example ACC processor circuitry of FIG. 9 in conjunction with the ACC systems of FIGS. 2C and/or 2F.

Flowcharts representative of example machine readable instructions, which may be executed to configure processor circuitry to implement the ACC processor circuitry 202 of FIGS. 2A-2F, are shown in FIGS. 10 and 11. The machine-readable instructions may be one or more executable programs or portion(s) of an executable program for execution by processor circuitry, such as the processor circuitry 1212 shown in the example processor platform 1200 discussed below in connection with FIG. 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10 and 11, many other methods of implementing the example ACC processor circuitry 202 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java. C #, Perl, Python, JavaScript, HyperText Markup Language (HTML). Structured Query Language (SQL), Swift, etc.

As mentioned above, the example operations of FIGS. 10 and 11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine-readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

FIG. 10 is a flowchart representative of example machine readable instructions and/or example operations 1000 that may be executed and/or instantiated by processor circuitry to control blade tip clearance in the first example ACC system 200 of FIG. 2A, the second example ACC system 250 of FIG. 2B, the fourth example ACC system 254 of FIG. 2D, and/or the fifth example ACC system 256 of FIG. 2E. The machine-readable instructions and/or the operations 1000 of FIG. 10 begin at block 1005, at which the ACC processor circuitry 202 (FIGS. 2A-2B, 2D-2E, and 9) obtains sensor data from the engine sensor(s) 235 (FIGS. 2A-2B, 2D-2E). For example, the sensor(s) processor circuitry 910 (FIG. 9) can obtain the sensor data from the engine sensor(s) 235. In some examples, the sensor data includes flight condition data obtained by the engine sensor(s) 235 from an engine (e.g., the gas turbine engine 100 of FIG. 1). In some examples, the flight condition data of the sensor data includes values for a plurality of input variables relating to flight conditions (e.g., air density, throttle lever position, engine temperatures, engine pressures, etc.).

At block 1010, the ACC processor circuitry 202 monitors engine conditions based on the sensor data from the engine sensor(s) 235. For example, the sensor(s) processor circuitry 910 can calculate and monitor the fuel flow, stator vane position, air bleed valve position, etc., using the flight condition data included in the sensor data.

At block 1015, the ACC processor circuitry 202 determines if a case is expanding. For example, the case can be a case surrounding a high-pressure turbine (e.g., the HP turbine 118 of FIG. 1, the high-pressure turbine 211 of FIGS. 2A-2B, 2D-2E), a low-pressure turbine (e.g., the LP turbine 120 of FIG. 1, the low-pressure turbine 215 of FIGS. 2A-2B, 2D-2E) or a compressor (e.g., the HP compressor 114 and LP compressor 112 of FIG. 1). In some examples, the sensor(s) processor circuitry 910 determines if the case is expanding based on the engine conditions determined from the obtained flight condition data. When the example sensor(s) processor circuitry 910 determines that the case is expanding, then the example operations 1000 proceed to block 1020. Otherwise, when the example sensor(s) processor circuitry 910 determines that the case is not expanding, then the operations 1000 skip to block 1045.

At block 1020, the ACC processor circuitry 202 causes the first inlet valve 206, the second inlet valve 210, and/or the mid-pipe valve 214 to at least partially open in response to determining the case is expanding. For example, the valve actuation control circuitry 920 can cause the first actuator(s) 204, the second actuator(s) 208, and/or the third actuator(s) 212 to increase an open cross-sectional area defined by the first inlet valve 206 at the first inlet 216, the second inlet valve 210 at the second inlet 218, and/or the mid-pipe valve 214 in the first pipe 205 or the second pipe 207, respectively. In some examples, the first actuator(s) 204 and/or the second actuator(s) 208 cause the vanes 308 of FIGS. 3A-3C, 4A-B, and/or 5A-B to rotate to open the first inlet valve 206 and/or the second inlet valve 210. In some examples, the third actuator(s) 212 cause the outer hoop 708 of FIGS. 7A-7B and/or the pivot joints 704 of FIGS. 7A-7B to rotate to move the swing wings 602, 702 of FIGS. 6A-6C and/or 7A-7B further out of the mid-pipe valve 214 to open the mid-pipe valve 214.

At block 1025, the ACC processor circuitry 202 obtains updated sensor data from the engine sensor(s) 235. For example, the sensor(s) processor circuitry 910 (FIG. 9) can obtain the sensor data from the engine sensor(s) 235 again a predetermined period of time after the position(s) of the valve(s) 206, 210, 214 have been adjusted.

At block 1030, the ACC processor circuitry 202 monitors updated engine conditions based on the sensor data from the engine sensor(s) 235. For example, the sensor(s) processor circuitry 910 can calculate and monitor updated the fuel flow, stator vane position, air bleed valve position, etc., again using the flight condition data included in the sensor data.

At block 1035, the ACC processor circuitry 202 determines if the case is still expanding. For example, the sensor(s) processor circuitry 910 can determine if the case is still expanding based on the engine conditions determined from the obtained flight condition data. When the example sensor(s) processor circuitry 910 determines that the case is still expanding, then the example operations 1000 proceed to block 1040. Otherwise, when the example sensor(s) processor circuitry 910 determines that the case is no longer expanding, then the operations 1000 skip to block 1055.

At block 1040, the ACC processor circuitry 202 causes the first inlet valve 206 and/or the second inlet valve 210 to protrude into an airflow passageway adjacent the first inlet 216 and/or the second inlet 218, respectively. In some examples, the valve actuation control circuitry 920 causes the first actuator(s) 204 to move at least a portion of the first inlet valve 206 into an airflow passage defined by a fan section (e.g., the fan section 201 of FIGS. 2A-2F, the fan section 106 of FIG. 1) and/or a bypass airflow passage (e.g., the bypass airflow passage 203 of FIGS. 2A-2F, the bypass airflow passage 140 of FIG. 1). Additionally or alternatively, the valve actuation control circuitry 920 can cause the second actuator(s) 208 to move at least a portion of the second inlet valve 210 into an airflow passage defined by a compressor section (e.g., the compressor section 209 of FIGS. 2A-2F, the LP compressor 112, the HP compressor 114, etc.). For example, the valve actuation control circuitry 920 can cause the first linear actuator 402 of FIGS. 4A-4B, the second linear actuator 404 of FIGS. 4A-4B, and/or the actuator 504 of FIGS. 5A-5B to cause the vanes 308 to extend into an airflow passage bordering the inlet 302 of FIGS. 3A-3C, 4A-B, and/or 5A-B.

At block 1045, the ACC processor circuitry 202 determines if the case is shrinking. In some examples, the sensor(s) processor circuitry 910 determines if the case is shrinking based on the engine conditions determined from the obtained flight condition data. When the example sensor(s) processor circuitry 910 determines that the case is shrinking, then the example operations proceed to block 1050. Otherwise, when the example sensor(s) processor circuitry 910 determines that the case is not shrinking, then the example operations skip to block 1055.

At block 1050, the ACC processor circuitry 202 causes the first inlet valve 206, the second inlet valve 210, and/or the mid-pipe valve 214 to at least partially close and/or retract from the adjacent airflow passage in response to determining the case is shrinking. For example, the valve actuation control circuitry 920 can cause the first actuator(s) 204, the second actuator(s) 208, and/or the third actuator(s) 212 to decrease an open cross-sectional area defined by the first inlet valve 206 at the first inlet 216, the second inlet valve 210 at the second inlet 218, and/or the mid-pipe valve 214 in the first pipe 205 or the second pipe 207, respectively. In some examples, the first actuator(s) 204 and/or the second actuator(s) 208 cause the vanes 308 to rotate to close the first inlet valve 206 and/or the second inlet valve 210. In some examples, the third actuator(s) 212 cause the outer hoop 708 of FIGS. 7A-7B and/or the pivot joints 704 of FIGS. 7A-7B to rotate to move the swing wings 602, 702 further into the mid-pipe valve 214 to close the mid-pipe valve 214. In some examples the valve actuation control circuitry 920 causes the first actuator(s) 204 to move at least a portion of the first inlet valve 206 out of the airflow passage defined by the fan section and/or the bypass airflow passage. Additionally or alternatively, the valve actuation control circuitry 920 can cause the second actuator(s) 208 to move at least a portion of the second inlet valve 210 out of the airflow passage defined by the compressor section. For example, the valve actuation control circuitry 920 can cause the first linear actuator 402, the second linear actuator 404, and/or the actuator 504 to cause the vanes 308 to retract from the airflow passage bordering the inlet 302.

At block 1055, the ACC processor circuitry 202 determines whether to continue operating. For example, the ACC processor circuitry 202 continues operating when the engine is still operating. When the ACC processor circuitry 202 continues operating, the operations 1000 return to block 1005. Otherwise, the operations 1000 terminate.

FIG. 11 is a flowchart representative of example machine readable instructions and/or example operations 1100 that may be executed and/or instantiated by processor circuitry to control blade tip clearance in the third example ACC system 252 of FIG. 2C and/or the sixth example ACC system 258 of FIG. 2F. The machine-readable instructions and/or the operations 1100 of FIG. 11 begin at block 1105, at which the ACC processor circuitry 202 (FIGS. 2C, 2F, and 9) obtains sensor data from the engine sensor(s) 235 (FIGS. 2C, 2F). For example, the sensor(s) processor circuitry 910 (FIG. 9) can obtain the sensor data from the engine sensor(s) 235. In some examples, the sensor data includes flight condition data obtained by the engine sensor(s) 235 from an engine (e.g., the gas turbine engine 100 of FIG. 1). In some examples, the flight condition data of the sensor data includes values for a plurality of input variables relating to flight conditions (e.g., air density, throttle lever position, engine temperatures, engine pressures, etc.).

At block 1110, the ACC processor circuitry 202 monitors engine conditions based on the sensor data from the engine sensor(s) 235. For example, the sensor(s) processor circuitry 910 can calculate and monitor the fuel flow, stator vane position, air bleed valve position, etc., using the flight condition data included in the sensor data.

At block 1115, the ACC processor circuitry 202 determines if a case is expanding. For example, the case can be a case surrounding a high-pressure turbine (e.g., the HP turbine 118 of FIG. 1, the high-pressure turbine 211 of FIGS. 2C, 2F), a low-pressure turbine (e.g., the LP turbine 120 of FIG. 1, the low-pressure turbine 215 of 2C. 2F) or a compressor (e.g., the HP compressor 114 and LP compressor 112 of FIG. 1). In some examples, the sensor(s) processor circuitry 910 determines if the case is expanding based on the engine conditions determined from the obtained flight condition data. When the example sensor(s) processor circuitry 910 determines that the case is expanding, then the example operations 1100 proceed to block 1120. Otherwise, w % ben the example sensor(s) processor circuitry 910 determines that the case is not expanding, then the operations 1100 skip to block 1125.

At block 1120, the ACC processor circuitry 202 causes the mid-pipe valve 214 to at least partially open in response to determining the case is expanding. For example, the valve actuation control circuitry 920 can cause the third actuator(s) 212 to increase an open cross-sectional area defined by the mid-pipe valve 214 in the first pipe 205 or the second pipe 207. In some examples, the third actuator(s) 212 cause the outer hoop 708 of FIGS. 7A-7B and/or the pivot joints 704 of FIGS. 7A-7B to rotate to move the swing wings 602, 702 of FIGS. 6A-6C and/or 7A-7B further out of the mid-pipe valve 214 to open the mid-pipe valve 214.

At block 1125, the ACC processor circuitry 202 determines if the case is shrinking. In some examples, the sensor(s) processor circuitry 910 determines if the case is shrinking based on the engine conditions determined from the obtained flight condition data. When the example sensor(s) processor circuitry 910 determines that the case is shrinking, then the example operations proceed to block 1130. Otherwise, when the example sensor(s) processor circuitry 910 determines that the case is not shrinking, then the example operations skip to block 1135.

At block 1130, the ACC processor circuitry 202 causes the mid-pipe valve 214 to at least partially close in response to determining the case is shrinking. For example, the valve actuation control circuitry 920 can cause the third actuator(s) 212 to decrease an open cross-sectional area defined by the mid-pipe valve 214 in the first pipe 205 or the second pipe 207. In some examples, the third actuator(s) 212 cause the outer hoop 708 of FIGS. 7A-7B and/or the pivot joints 704 of FIGS. 7A-7B to rotate to move the swing wings 602, 702 further into the mid-pipe valve 214 to close the mid-pipe valve 214.

At block 1135, the ACC processor circuitry 202 determines whether to continue operating. For example, the ACC processor circuitry 202 continues operating when the engine is still operating. When the ACC processor circuitry 202 continues operating, the operations 1100 return to block 1105. Otherwise, the operations 1100 terminate.

Figure 12:
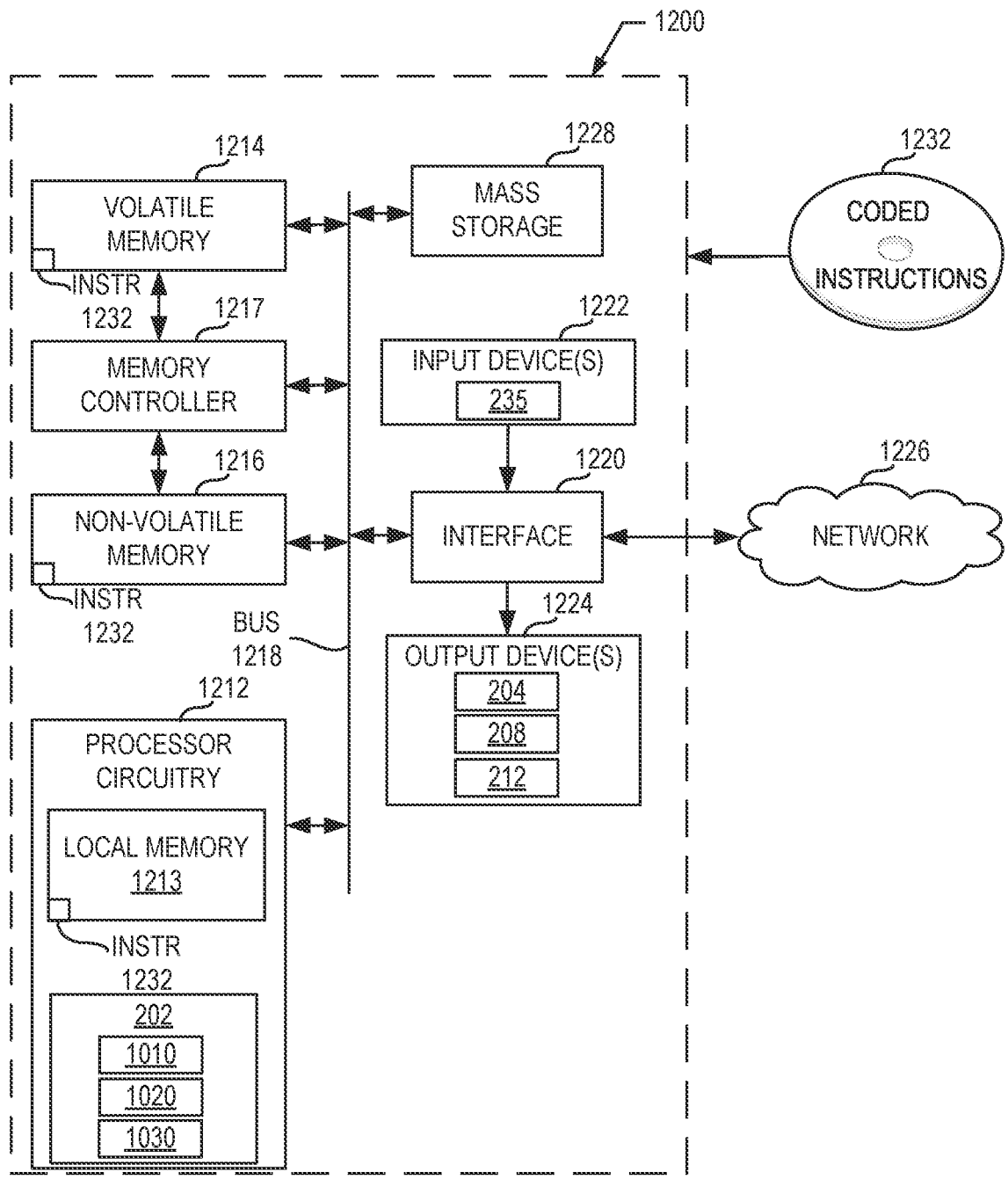
FIG. 12 is a block diagram of an example processing platform including processor circuitry structured to execute the example machine readable instructions and/or the example operations of FIGS. 10 and/or 11 to implement the ACC processor circuitry of FIG. 9.

FIG. 12 is a block diagram of an example processor platform 1200 structured to execute and/or instantiate the machine-readable instructions and/or the operations of FIGS. 11 and/or 12 to implement the ACC system 200, 250, 252, 254, 256, 258 of FIGS. 2A-2F. The processor platform 1200 can be, for example, a digital computer (e.g., a FADEC, an EEC, an ECU, etc.) or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits. FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the ACC processor circuitry 202 including the sensor(s) processor circuitry 910 and the valve actuation control circuitry 920.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM). Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, a flow rate sensor, an air density sensor, throttle lever position sensor, engine temperature sensors, engine pressure sensors, direct clearance measurement sensors, indirect clearance measurement sensors, and/or any other type of sensor. In this example, the input device(s) 1222 implements the engine sensor(s) 235.

One or more output devices 1224 are also connected to the interface circuitry 1220 of the illustrated example. The output device(s) 1224 can be implemented, for example, by a linear actuator, a rotary actuator, a hydraulic actuator, a pneumatic actuator, an electric actuator, and/or any other type of actuator. The interface circuitry 1220 of the illustrated example, thus, typically includes a graphics driver card, a graphics driver chip, and/or graphics processor circuitry such as a GPU. In this example, the output device(s) 1224 implements the actuators 204, 208, 212, 402, 404, 504.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine-readable instructions 1232, which may be implemented by the machine-readable instructions of FIGS. 11-12, may be stored in the mass storage device 1228, in the volatile memory 1214, in the non-volatile memory 1216, and/or on a removable non-transitory computer readable storage medium such as a CD or DVD.

From the foregoing, it will be appreciated that example systems, methods, apparatus, and articles of manufacture have been disclosed that actively control blade clearance in a gas turbine. Example valves disclosed herein enable positional adjustments to linearly correspond with open flow area in an ACC pipe and a flow rate through the ACC pipe. As a result, example valves disclosed herein can be implemented in an ACC system with a reduced pre-implementation testing and/or modeling burden. Furthermore, example valves disclosed herein can protrude from the ACC pipe to intercept more air from an adjacent airflow passage, which reduces a reliance of the ACC system on a flow rate in the airflow passage in controlling blade clearance.

The foregoing examples of valves can be used with any ACC system and/or any other system to control a rate at which fluid flows. Although each example valve disclosed above has certain features, it should be understood that it is not necessary for a particular feature of one example valve to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Example active clearance control valves and related methods are disclosed herein. Further examples and combinations thereof include the following:

Example 1 is an apparatus comprising a pipe defining a flow path between (i) at least one of a fan section, a bypass airflow passage, or a compressor section and (ii) a turbine section of the gas turbine, the pipe including an inlet fluidly coupled to at least one of the fan section, the bypass airflow passage, or the compressor section, and a valve coupled to the pipe and positioned downstream of the inlet, the valve including swing wings, the swing wings positioned around an opening in the pipe defined by the second valve when the second valve is at least partially open.

Example 2 includes the apparatus of any preceding clause, wherein the swing wings are rotatable, the swing wings including a first edge and a second edge, the first edge including a convex curvature, the second edge including a concave curvature.

Example 3 includes the apparatus of any preceding clause, wherein the swing wings include at least a first swing wing and a second swing wing, the first swing wing overlapping the second swing wing when the second valve is in a closed position and when the second valve is at least partially open.

Example 4 includes the apparatus of any preceding clause, wherein the opening has a center point that corresponds with a center of the pipe when the second valve is at least partially open.

Example 5 includes the apparatus of any preceding clause, further including an inner hoop, an outer hoop, and pivot rods positioned between the inner hoop and the outer hoop, the pivot rods coupled to the swing wings, a first rotation of the pivot rods in a first direction to cause the swing wings to move towards a central axis defined by the pipe, a second rotation of the pivot rods in a second direction to cause the swing wings to move away from the central axis defined by the pipe.

Example 6 includes the apparatus of any preceding clause, wherein the first rotation of the pivot rods is driven by a third rotation of the outer hoop, and the second rotation of the pivot rods is driven by a fourth rotation of the outer hoop.

Example 7 includes the apparatus of any preceding clause, wherein the first valve includes vanes, the vanes to define slots through which the air enters the pipe from the fan section or the compressor section when the first valve is in at least partially open.

Example 8 includes the apparatus of any preceding clause, further including an actuator to adjust an angular displacement of the vanes to control a rate at which the air enters the pipe.

Example 9 includes the apparatus of any preceding clause, further including an actuator to cause at least one of the vanes to protrude from the pipe into at least one of the fan section, the bypass airflow passage, or the compressor section.

Example 10 is an apparatus comprising a conduit in fluid connection with a turbine section, the conduit including an inlet to receive air driven by at least one of a fan or a compressor of the turbine engine, and a valve coupled to the conduit at the inlet, the valve positioned between the conduit and an airflow passage in which the air flows towards the turbine section.

Example 11 includes the apparatus of any preceding clause, wherein the valve includes vanes having an angular displacement that defines a cross-sectional area through which the air enters the conduit.

Example 12 includes the apparatus of any preceding clause, further including an actuator operatively coupled to the vanes to cause the vanes to rotate.

Example 13 includes the apparatus of any preceding clause, further including an actuator operatively coupled to the vanes to cause a translational movement of at least one of the vanes.

Example 14 includes the apparatus of any preceding clause, further including a rod operatively coupled to the vanes, a pivot joint operatively coupled to a first end of the rod, and an actuator operatively coupled to a second end of the rod, the actuator to cause the vanes to extend past the inlet into the airflow passage.

Example 15 includes the apparatus of any preceding clause, wherein the vanes include a first face and a second face opposite the first face, the first face including concave curvature, the second face including convex curvature.

Example 16 includes the apparatus of any preceding clause, wherein the airflow passage is a bypass airflow passage defined between a nacelle and a casing of the turbine engine.

Example 17 includes the apparatus of any preceding clause, wherein the valve is a first valve, further including a second valve operatively coupled to the conduit downstream of the first valve.

Example 18 includes the apparatus of any preceding clause, wherein the second valve includes swing wings, pivot rods coupled to an end of the swing wings, an inner hoop, the pivot rods positioned around the inner hoop, positions of the pivot rods fixed relative to the inner hoop, an outer hoop positioned around the pivot rods, and an actuator to drive a first rotation of the outer hoop, the first rotation of the outer hoop to cause a second rotation of the pivot rods, the second rotation of the pivot rods to cause a third rotation of the swing wings about the pivot rods.

Example 19 includes the apparatus of any preceding clause, wherein the swing wings are overlapping in a cross-sectional area defined by the conduit.

Example 20 is an apparatus to control clearance between blade tips and a casing of a turbine engine, the apparatus comprising means for routing air from (i) a fan section, a bypass airflow passage, or a compressor section to (ii) a turbine section of the turbine engine, and means for defining a cross-sectional area through which the air can flow at least one of into or through the means for routing air, the means for defining the cross-sectional area including at least one of (i) means for defining slots at an inlet of the means for routing air or (ii) means for linearly adjusting a flow rate of the air in the means for routing air, the means for linearly adjusting defining a linear relationship between the flow rate and positions of the means for linearly adjusting throughout a positional range of the means for linearly adjusting.

Example 21 includes the apparatus of any preceding clause, further including processor circuitry to cause the actuator to move at least one of the vanes into at least one of the fan section, the bypass airflow passage or the compressor section in response to a case around the turbine section expanding.

Example 22 includes the apparatus of any preceding clause, wherein the swing wings include a first outer portion, a second outer portion, and a middle portion between the first outer portion and the second outer portion, wherein the middle portion has a greater width than the first outer portion and the second outer portion.

Example 23 includes the apparatus of any preceding clause, wherein the second valve defines a linear relationship between a flow rate in the flow path and positions of the second valve throughout a positional range of the second valve.

Example 24 is a method to control clearance between blade tips and a casing of a turbine engine, the method comprising obtaining sensor data, monitoring engine conditions, determining whether the casing is expanding, in response to the casing expanding, causing one or more valve(s) to open, obtaining updated sensor data, monitoring updated engine conditions, determining whether the casing is still expanding, in response to determining that the casing is still expanding, causing the valve(s) to protrude into an airflow passage defined by a fan section, a compressor section, or a bypass airflow passage, in response to the casing not expanding, determining whether the casing is shrinking, in response to determining that the casing is shrinking, causing the valve(s) to at least partially close and/or retract from the airflow passage.

Example 25 is a non-transitory machine readable storage medium comprising instructions that, when executed, cause processor circuitry to at least obtain sensor data, monitor engine conditions, determine whether the casing is expanding, in response to the casing expanding, cause one or more valve(s) to open, obtain updated sensor data, monitor updated engine conditions, determine whether the case is still expanding, in response to determining the casing is still expanding, cause the valve(s) to protrude into an airflow passage defined by a fan section, a compressor section, or a bypass airflow passage, in response to determining that the casing is not expanding, determine whether the casing is shrinking, in response to determining that the casing is shrinking, cause the valve(s) to at least partially close and/or retract from the airflow passage.

Example 26 is a method to control clearance between blade tips and a casing of a turbine engine, the method comprising obtaining sensor data, monitoring engine conditions, determining whether the casing is expanding, in response to determining the casing is expanding, causing one or more valve(s) to at least partially open, in response to determining the casing is not expanding, determining whether the casing is shrinking, and in response to determining that the casing is shrinking, causing the valve(s) to at least partially close.

Example 27 is a non-transitory machine readable storage medium comprising instructions that, when executed, cause processor circuitry to at least obtain sensor data, monitor engine conditions, determine whether the casing is expanding, in response to determining the casing is expanding, cause one or more valve(s) to at least partially open, in response to determining the casing is not expanding, determine whether the casing is shrinking, and in response to determining that the casing is shrinking, cause the valve(s) to at least partially close.

What is claimed is:

1. An apparatus comprising:
    a conduit in fluid connection with a turbine section, the conduit including an inlet to receive air driven by at least one of a fan or a compressor of a turbine engine;
    a valve coupled to the conduit at the inlet, the valve positioned between the conduit and an airflow passage in which the air flows towards the turbine section, wherein the valve includes vanes including a first vane and a second vane positioned at the inlet, the second vane downstream of the first vane in a direction in which the air flows towards the turbine section, wherein the first vane and the second vane are configured to move linearly towards or away from the airflow passage;
    a rod operatively coupled to the vanes;
    a first actuator operatively coupled to a first end of the rod; and
    a second actuator operatively coupled to a second end of the rod, the first actuator and the second actuator to cause the vanes to extend past the inlet into the airflow passage.

2. The apparatus of claim 1, wherein the vanes have an angular displacement that defines a cross-sectional area through which the air enters the conduit.

3. The apparatus of claim 2, further including an actuator operatively coupled to the vanes to cause the vanes to rotate.

4. The apparatus of claim 2, further including an actuator operatively coupled to the vanes to cause a translational movement of at least one of the vanes.

5. The apparatus of claim 2, wherein the vanes include a first face and a second face opposite the first face, the first face including concave curvature, the second face including convex curvature.

6. The apparatus of claim 1, wherein the airflow passage is a bypass airflow passage defined between a nacelle and a casing of the turbine engine.

7. The apparatus of claim 1, wherein the valve is a first valve, further including a second valve operatively coupled to the conduit downstream of the first valve.

8. The apparatus of claim 7, wherein the second valve includes:
    swing wings;
    pivot rods coupled to an end of the swing wings;
    an inner hoop, the pivot rods positioned around the inner hoop, positions of the pivot rods fixed relative to the inner hoop;
    an outer hoop positioned around the pivot rods; and
    an actuator to drive a first rotation of the outer hoop, the first rotation of the outer hoop to cause a second rotation of the pivot rods, the second rotation of the pivot rods to cause a third rotation of the swing wings about the pivot rods.

9. The apparatus of claim 8, wherein the swing wings are overlapping in a cross-sectional area defined by the conduit.

10. An apparatus comprising:
    means for routing air from (i) a fan section, a bypass airflow passage, or a compressor section to (ii) a turbine section of a turbine engine;
    means for adjusting a cross-sectional area through which the air can flow the means for routing air, the means for adjusting the cross-sectional area including means for defining slots at an inlet of the means for routing air, wherein the means for defining slots are rotatable to adjust the cross-sectional area of a first slot and a second slot at the inlet, the second slot downstream of the first slot;
    first means for linearly moving the first slot and the second slot towards or away from the means for routing air;
    second means for moving the first slot and the second slot towards or away from the means for routing air; and
    means for coupling the first means for moving, the second means for moving, and the means for adjusting.

11. The apparatus of claim 10, further including means for processing to cause the means for defining slots to move into at least one of the fan section, the bypass airflow passage, or the compressor section in response to a casing of the turbine engine expanding.

12. An apparatus comprising:
    a conduit in fluid connection with a turbine section, the conduit including an inlet to receive air driven by at least one of a fan or a compressor of a turbine engine;
    a valve positioned at the inlet, the valve including vanes that are rotatable to adjust a cross-sectional area of the inlet through which the air flows, and wherein the vanes include a first vane and a second vane positioned at the inlet, wherein the second vane is positioned downstream of the first vane in a direction in which the air flows towards the turbine section, wherein the first vane and the second vane are configured to move linearly in a radial direction defined by the turbine engine towards or away from an airflow passage adjacent to the inlet;
    a first linear actuator operatively coupled to the vanes to cause a translational movement of at least one of the vanes;

a second linear actuator; and a rod coupled to the vanes, the first linear actuator, and the second linear actuator, the first linear actuator and the second linear actuator to move the rod towards or away from the airflow passage, wherein the vanes are movable between (i) a first position in which ends of the vanes are positioned in the airflow passage and (ii) a second position in which the ends of the vanes are positioned outside of the airflow passage.

13. The apparatus of claim 12, wherein the first vane extends a first distance into the airflow passage, and wherein the second vane extends a second distance into the airflow passage, the second distance approximately equivalent to the first distance.

14. The apparatus of claim 12, wherein the valve is movable between a closed position and an open position.

15. The apparatus of claim 12, further including:

an actuator operatively coupled to the vanes to cause the vanes to rotate; and shafts coupled to the vanes, wherein the shafts define rotational axes of the vanes.

16. The apparatus of claim 15, wherein the rod is a first rod, further including a second rod coupled to the shafts, wherein a movement of the rod causes the shafts to rotate.

17. The apparatus of claim 12, wherein a rotation of the vanes is independent of a linear movement of the vanes.

* * * * *